| (12) | United States Patent | (10) Patent No.: | US 12,478,929 B2 |
|---|---|---|---|
| | Yamada | (45) Date of Patent: | Nov. 25, 2025 |

(54) FLUID ACTIVATING DEVICE

(71) Applicant: Yasuhira Yamada, Osaka (JP)

(72) Inventor: Yasuhira Yamada, Osaka (JP)

( * ) Notice: Subject to any disclaimer, the term of this patent is extended or adjusted under 35 U.S.C. 154(b) by 334 days.

(21) Appl. No.: 18/271,260

(22) PCT Filed: Dec. 22, 2021

(86) PCT No.: PCT/JP2021/047701
§ 371 (c)(1),
(2) Date: Jul. 7, 2023

(87) PCT Pub. No.: WO2022/153813
PCT Pub. Date: Jul. 21, 2022

(65) Prior Publication Data
US 2024/0299888 A1    Sep. 12, 2024

(30) Foreign Application Priority Data

Jan. 12, 2021  (JP) ................................. 2021-003031

(51) Int. Cl.
*B01F 23/23*    (2022.01)
*B01F 23/237*   (2022.01)
(Continued)

(52) U.S. Cl.
CPC ........ *B01F 23/2373* (2022.01); *B01F 23/237* (2022.01); *B01F 25/3131* (2022.01); *B01F 27/70* (2022.01)

(58) Field of Classification Search
CPC ........................... B01F 23/237; B01F 23/2373
See application file for complete search history.

(56) References Cited

U.S. PATENT DOCUMENTS 4,884,894 A     12/1989  Hashimoto et al.
2014/0247687 A1  9/2014  Mizuno et al.

FOREIGN PATENT DOCUMENTS

EP    1 746 073 A1   1/2007
JP       6242728 A   2/1987
(Continued)

OTHER PUBLICATIONS

International Search Report and Written Opinion issued in PCT Application No. PCT/JP2021/047701 mailed Mar. 8, 2022, 9 pages. (Partial English translation).

(Continued)

*Primary Examiner* — Robert A Hopkins
(74) *Attorney, Agent, or Firm* — Buchanan Ingersoll & Rooney PC

(57) ABSTRACT

Provided is an ultra-fine bubble generator capable of efficiently generating ultra-fine bubbles in fluid. The generator is a fluid activating device including: a shaft in a cylindrical columnar shape; a tubular body provided with a hollow part to accommodate the shaft with a predetermined interval between an inner peripheral surface of the hollow part and an outer peripheral surface of the shaft; and multiple blades that are provided between the outer peripheral surface of the shaft and an inner peripheral surface of the tubular body while forming a flow path extending spirally from one end of the tubular body toward another end of the tubular body, and that generate a turbulent flow in fluid flowing in the flow path, the tubular body having an inner peripheral surface provided with multiple ribs each composed of a ridge extending in an axial direction of the shaft.

10 Claims, 15 Drawing Sheets

(51) Int. Cl.
  *B01F 23/2373*   (2022.01)
  *B01F 25/313*   (2022.01)
  *B01F 27/70*   (2022.01)

(56) References Cited

FOREIGN PATENT DOCUMENTS

| | | | |
|---|---|---|---|
| JP | 2007524335 | A | 8/2007 |
| JP | 2012139646 | A | 7/2012 |
| JP | 2014195793 | A | 10/2014 |
| JP | 201780721 | A | 5/2017 |
| JP | 6490317 | B1 | 3/2019 |
| JP | 2022167025 | A * | 11/2022 |
| NO | 2019116642 | A1 | 6/2019 |
| WO | 2005008860 | A2 | 1/2005 |

OTHER PUBLICATIONS

The extended European Search Report issued Nov. 15, 2024, by the European Patent Office in corresponding European Patent Application No. 21919700.1-1017. (7 pages).

* cited by examiner

[Fig.1]
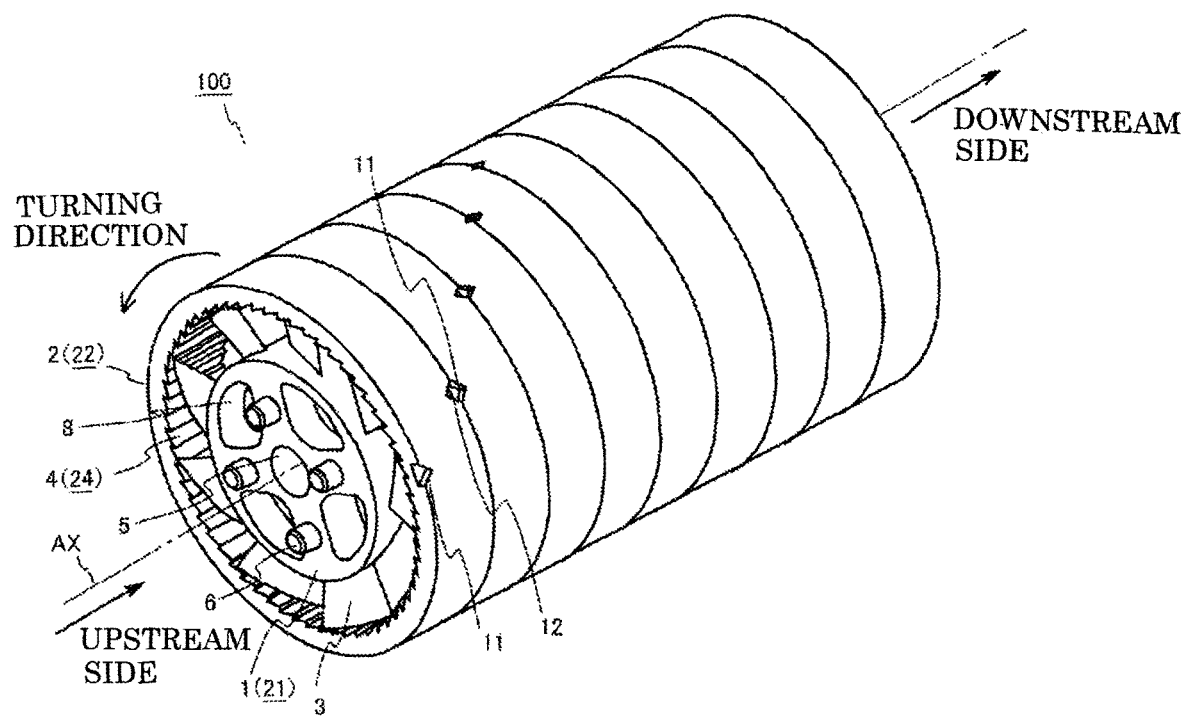
[Fig.2]
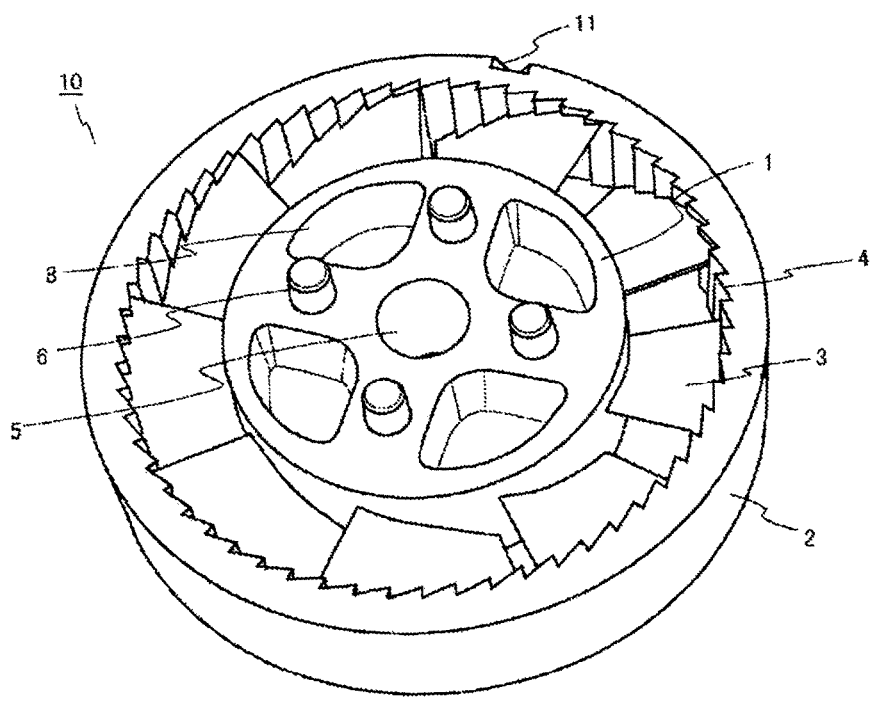

[Fig.3]
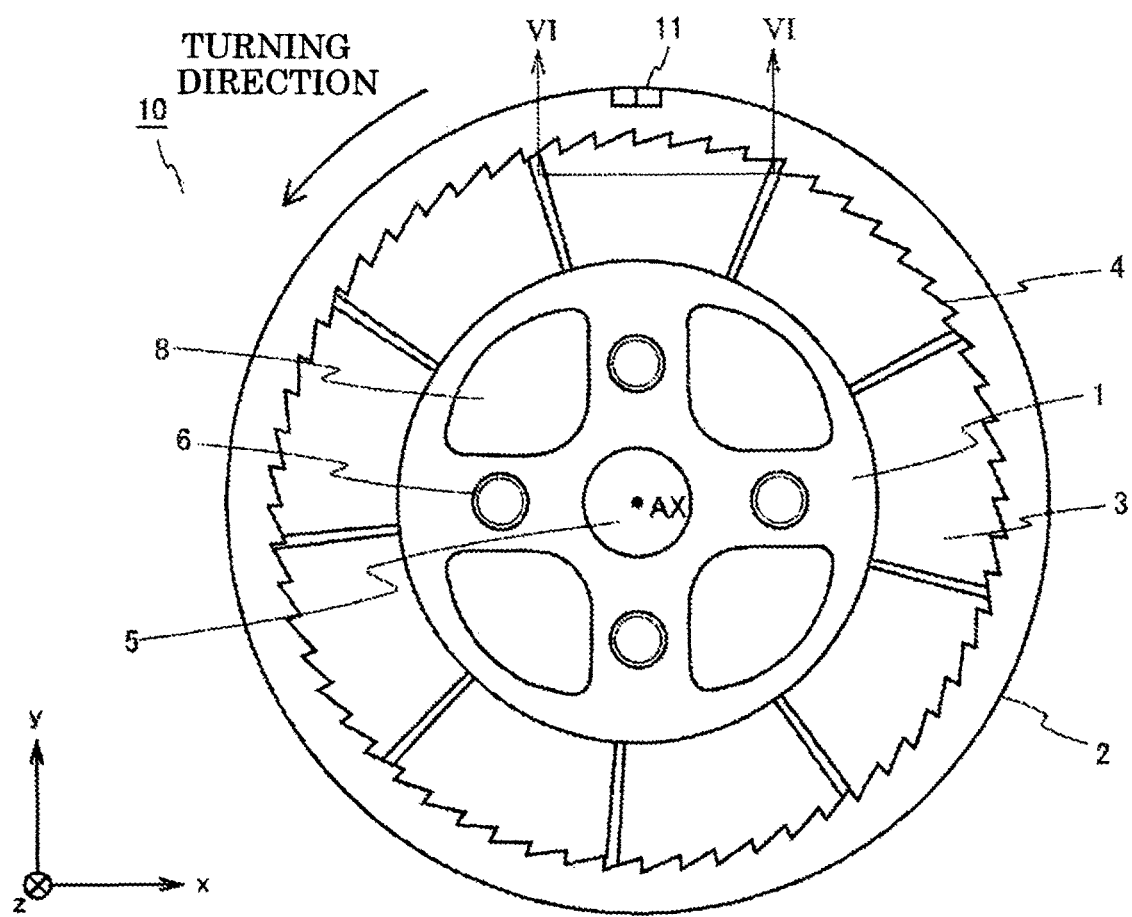

[Fig.4]
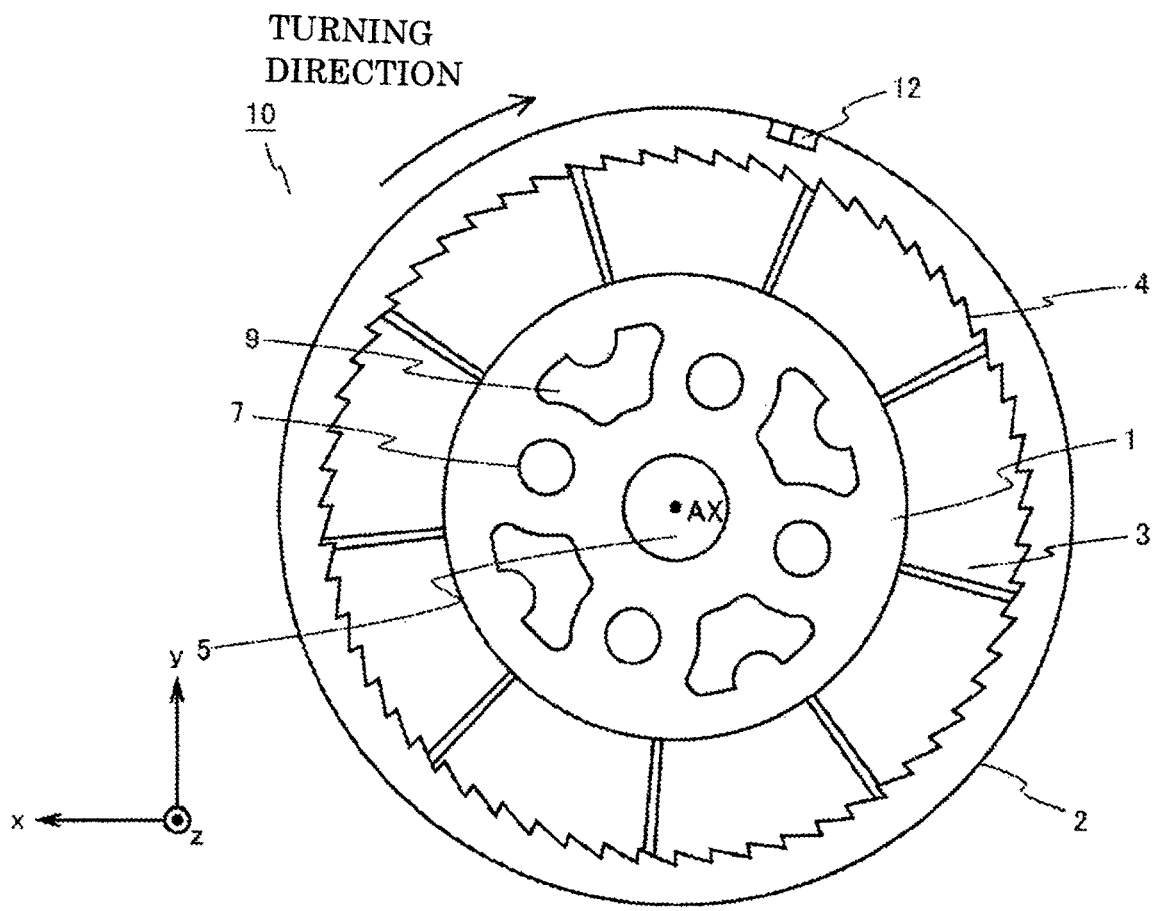
[Fig.5]
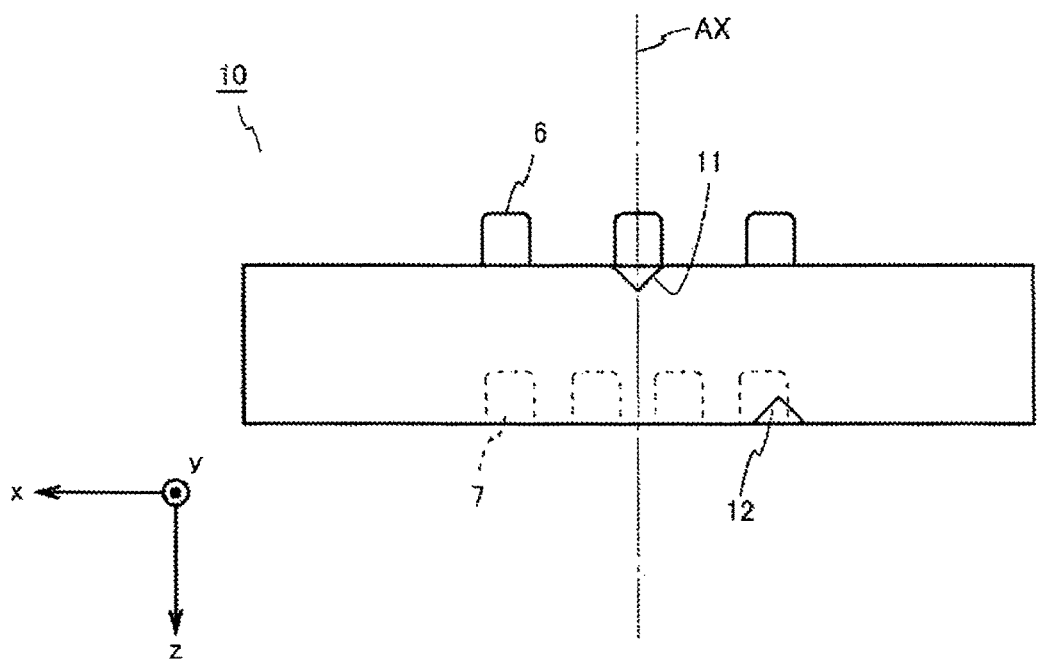

[Fig.6]
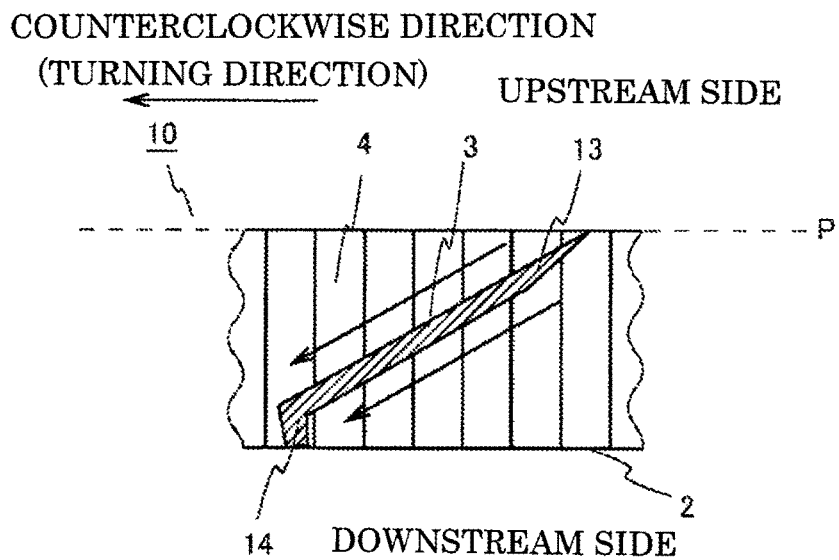
[Fig.7]
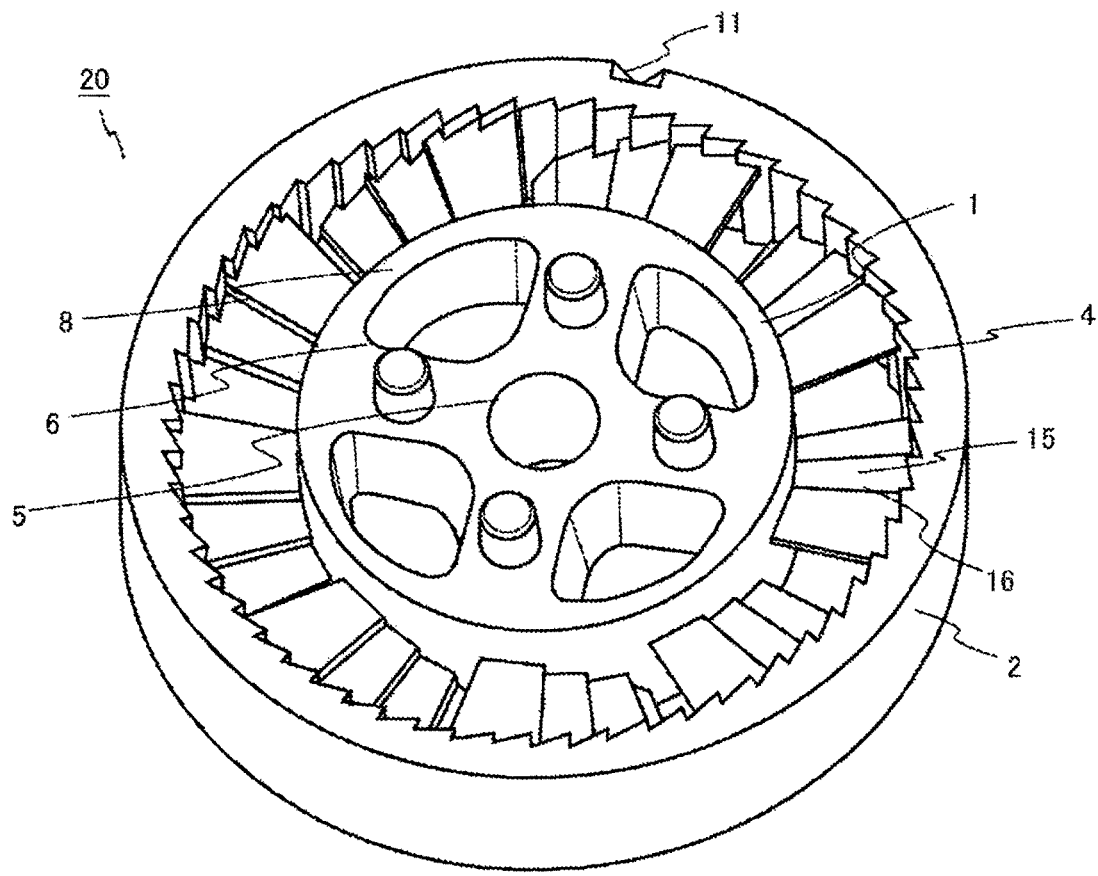

[Fig.8]
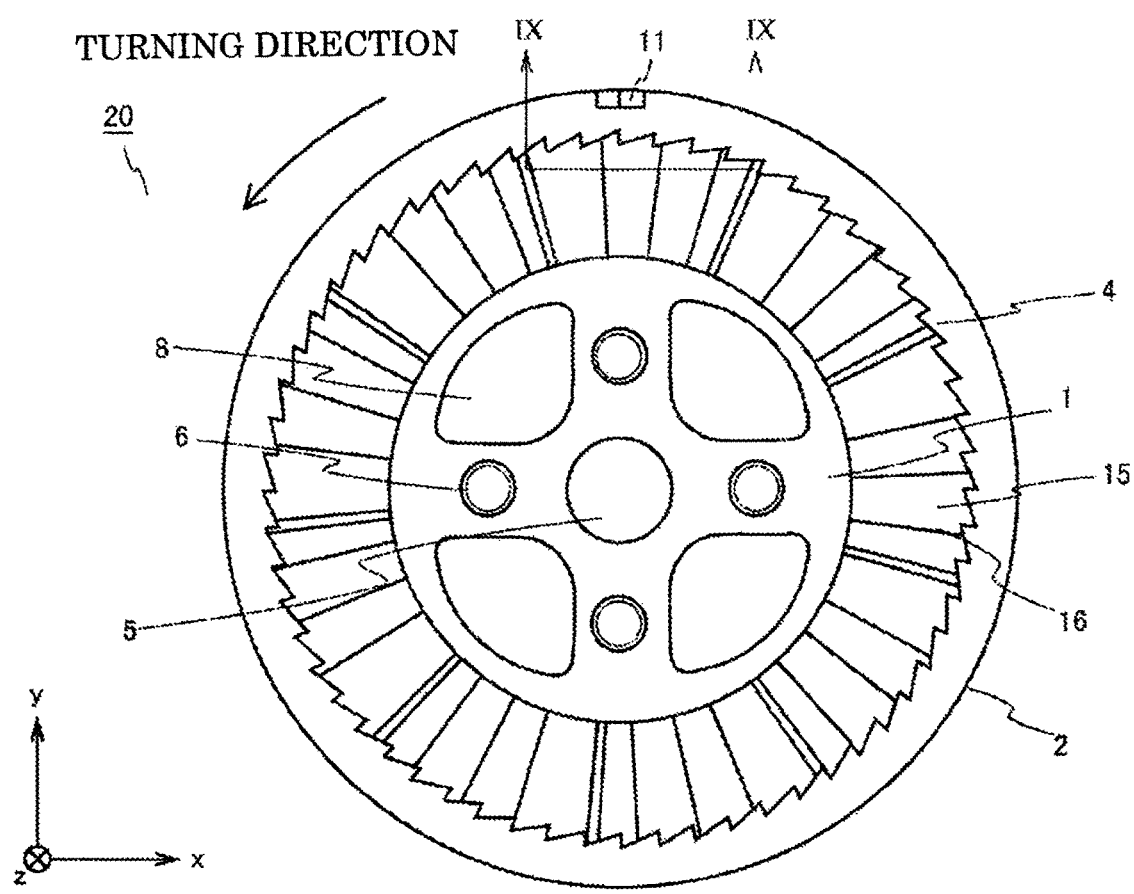

[Fig.9]
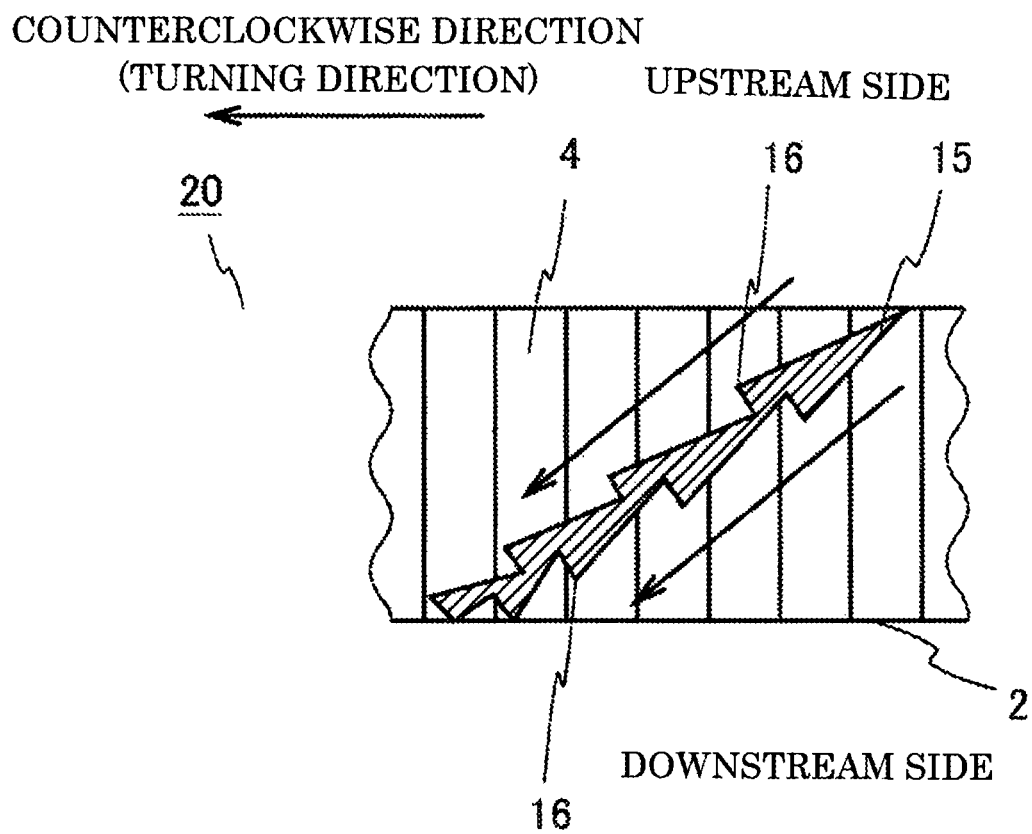

[Fig.10]
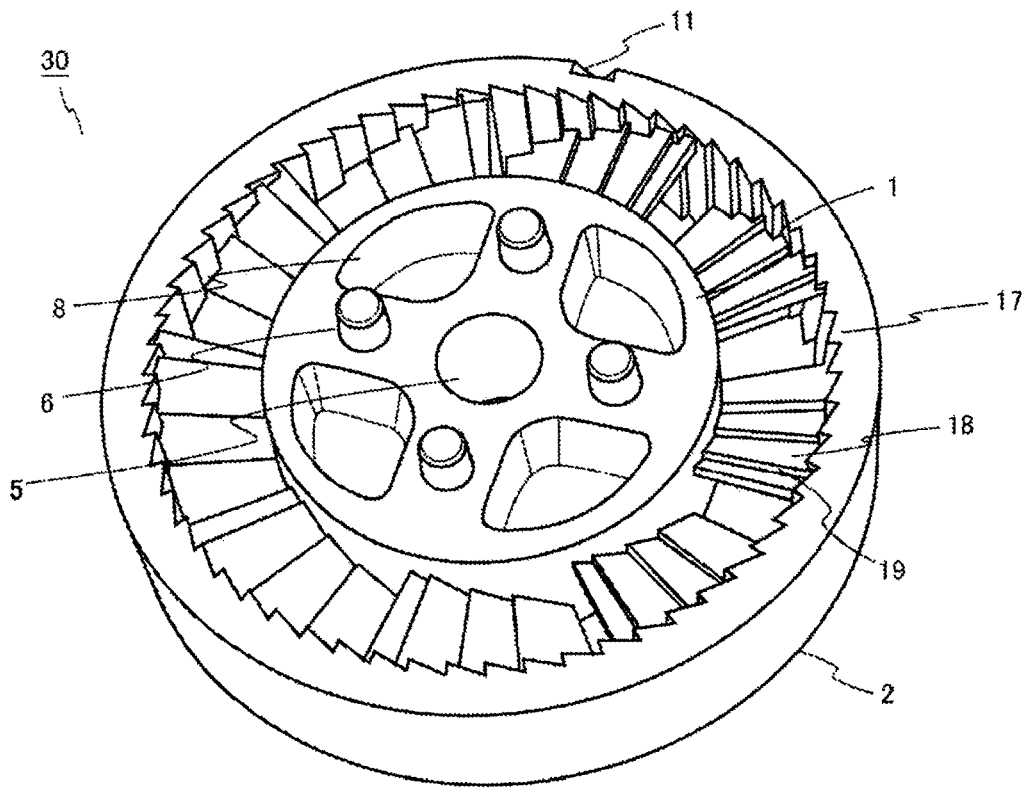
[Fig.11]
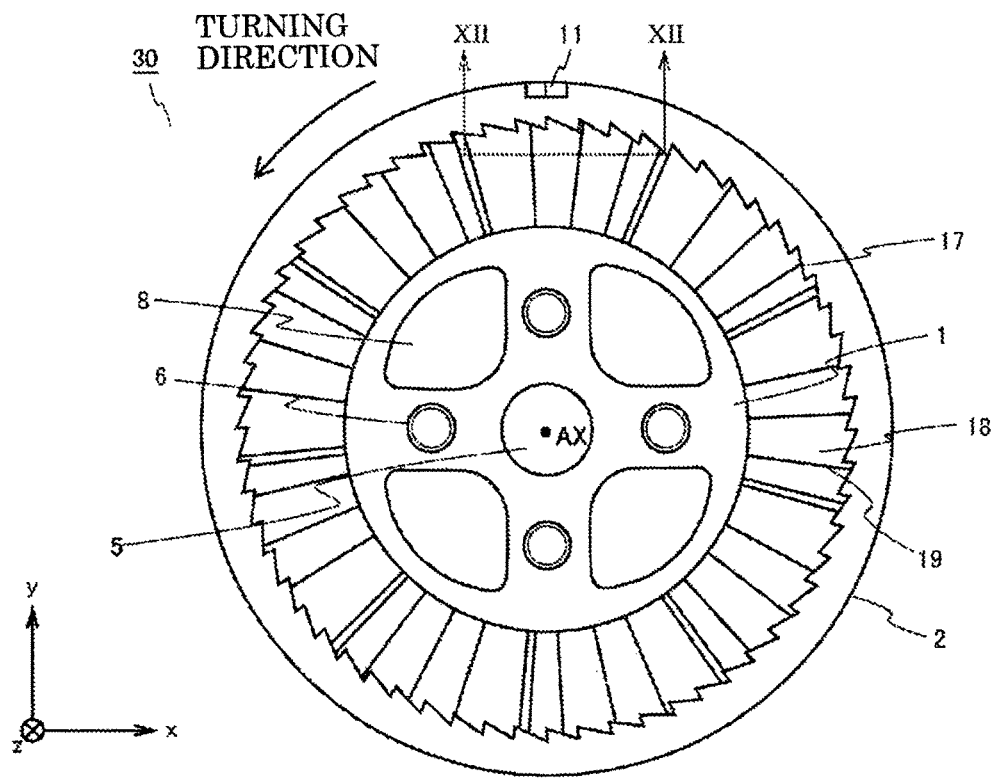

[Fig.12]
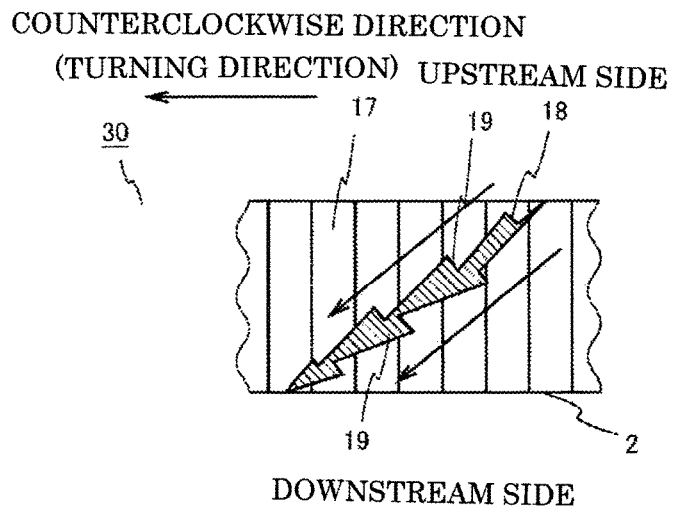
[Fig.13A]
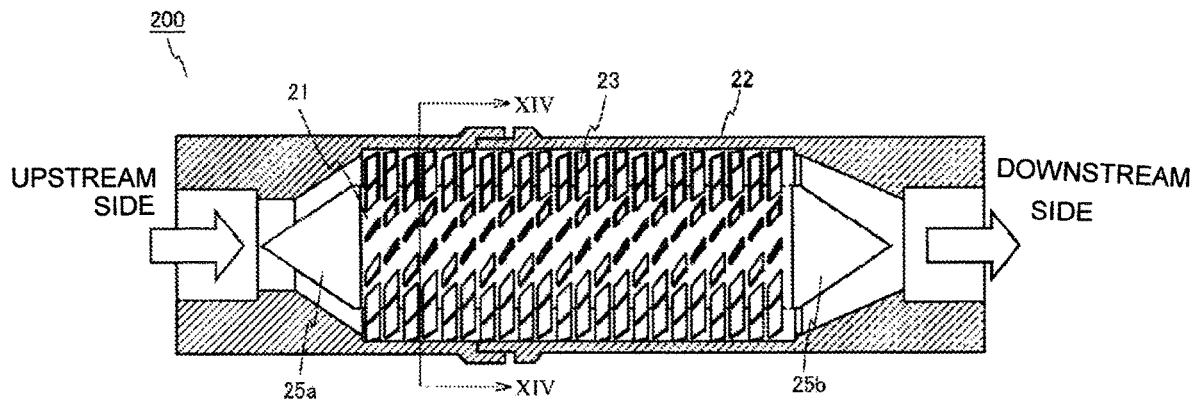
[Fig.13B]
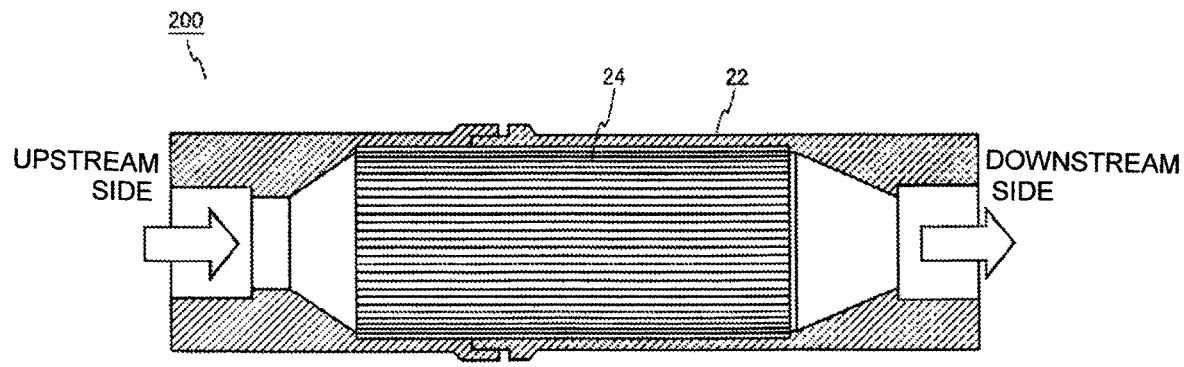

[Fig.14]
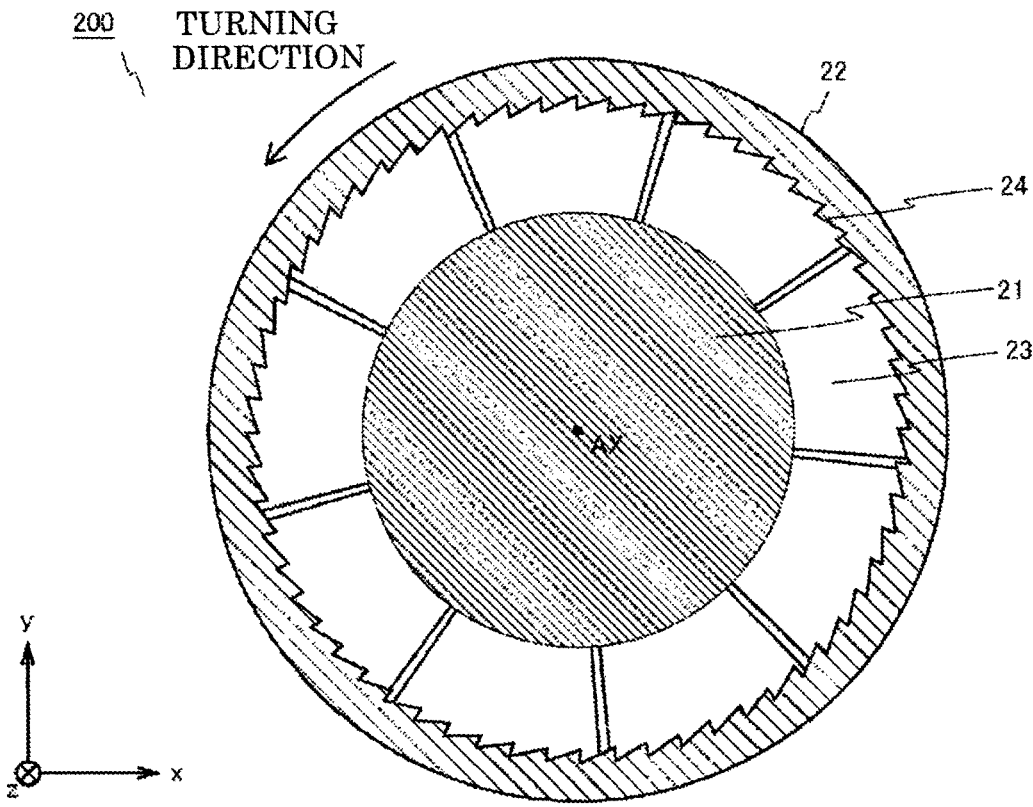
[Fig.15]
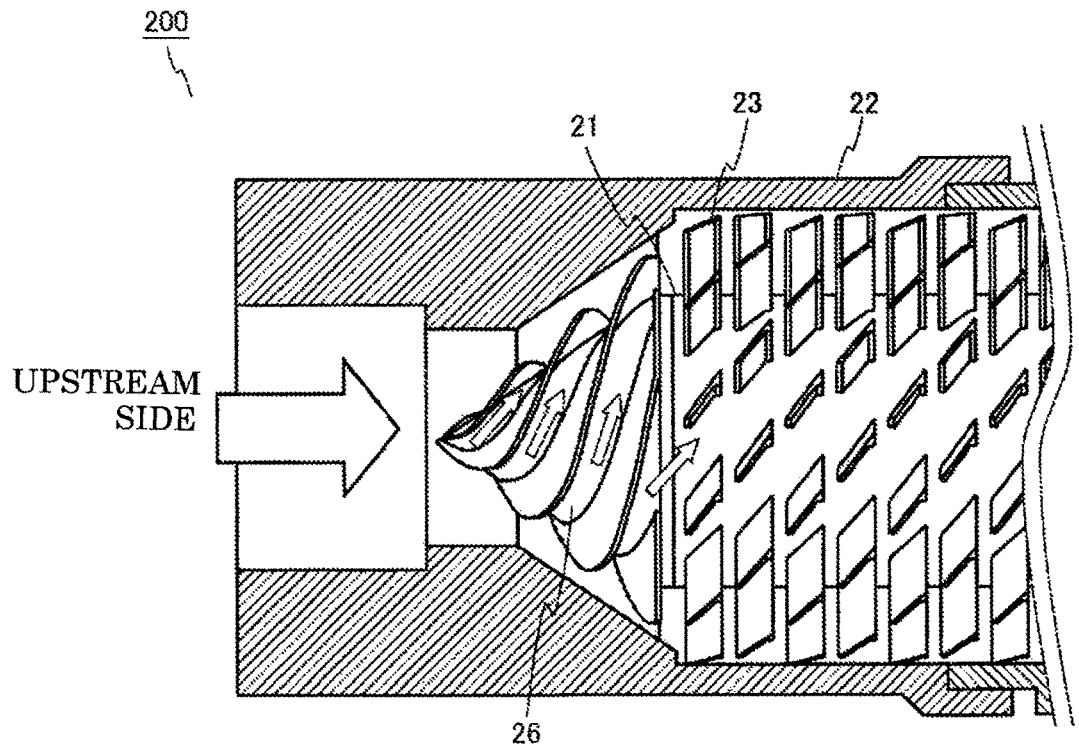

[Fig.16]
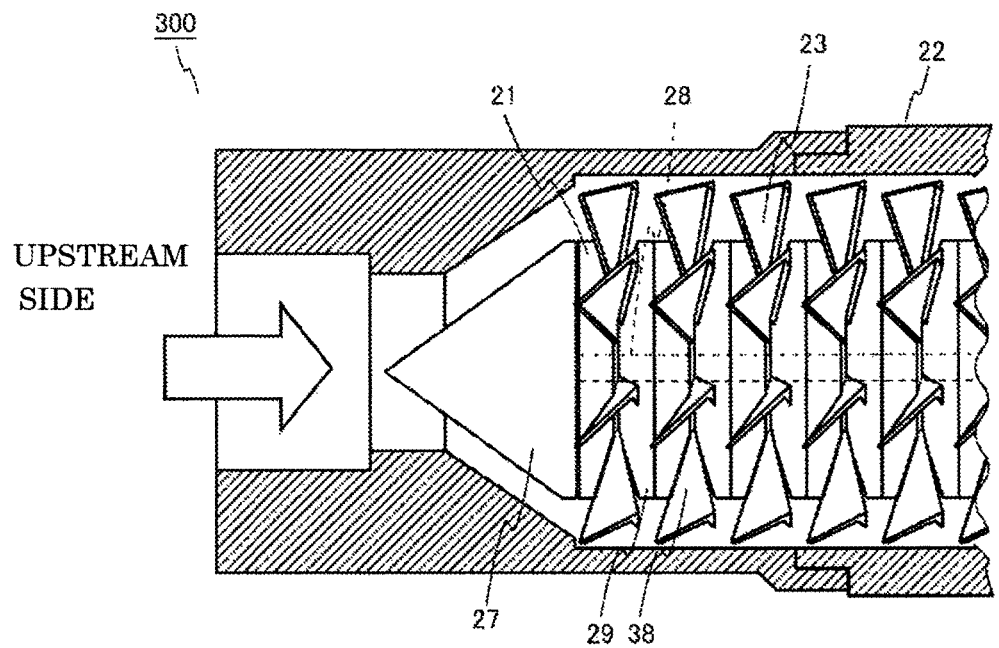
[Fig.17A]
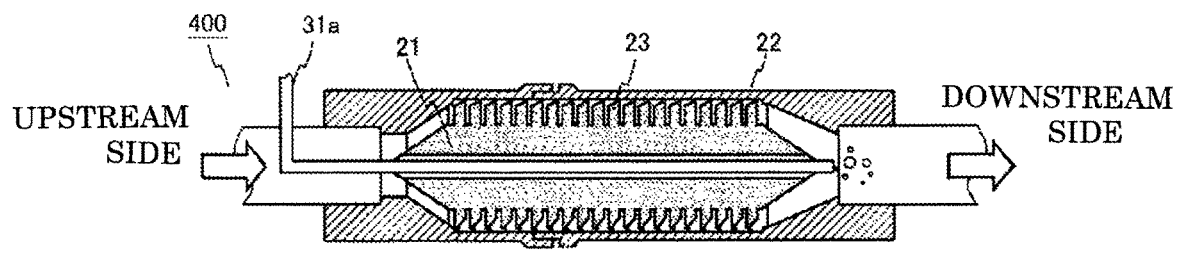
[Fig.17B]
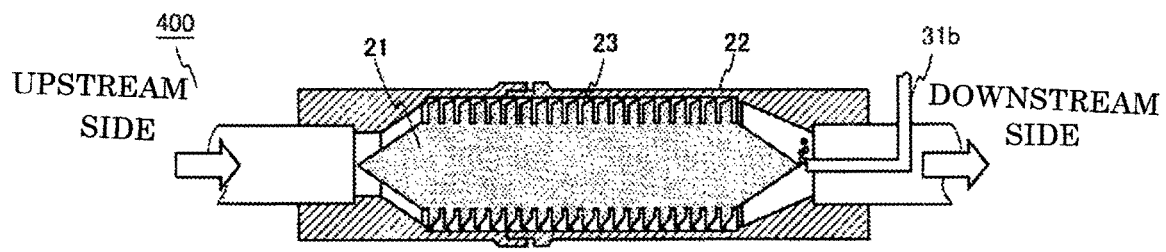

[Fig.17C]
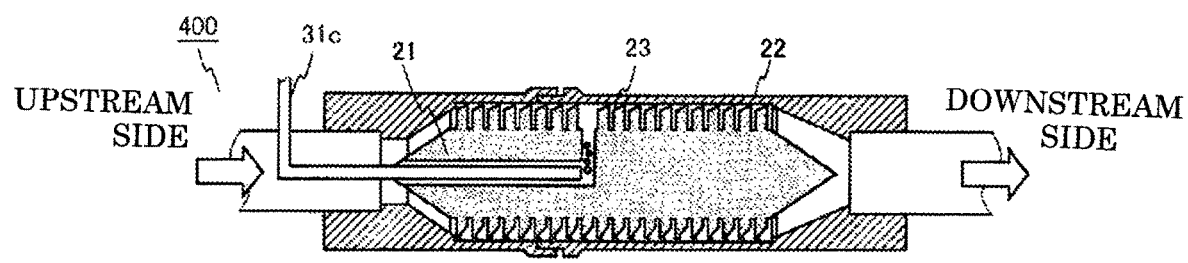
[Fig.17D]
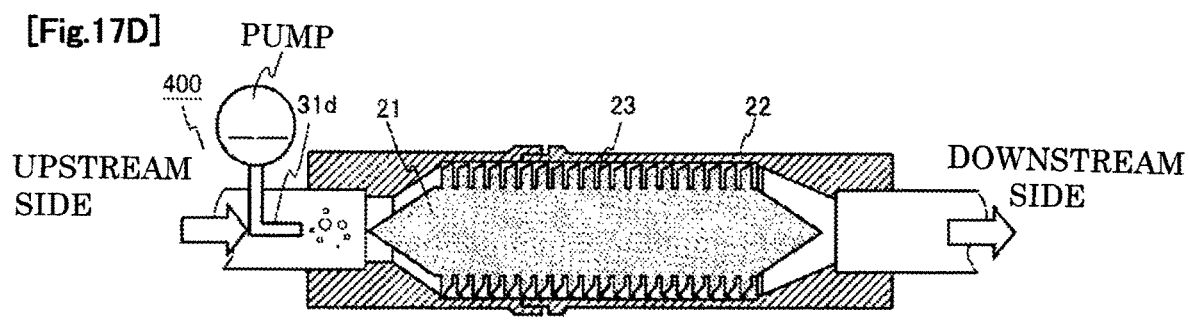
[Fig.18]
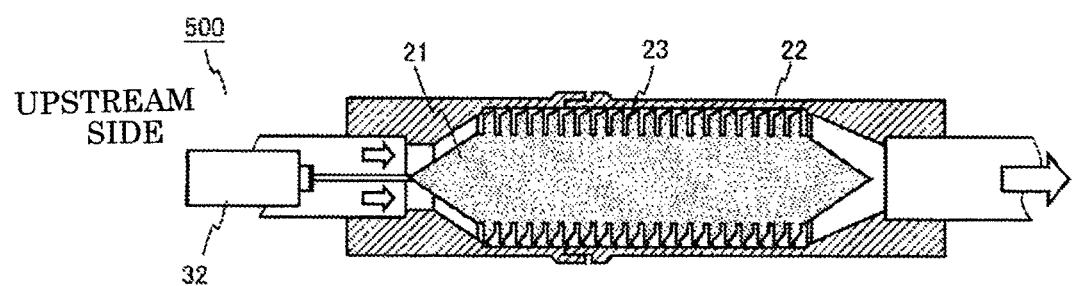

[Fig.19]
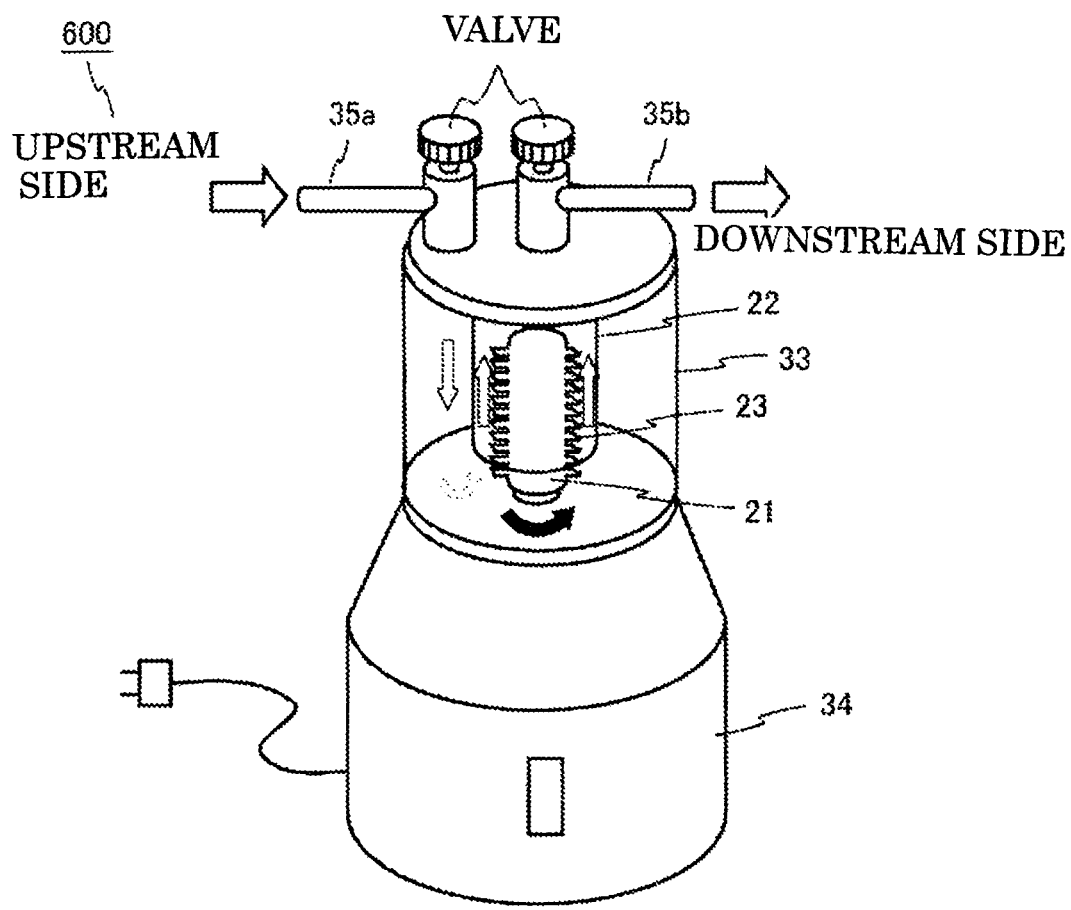

[Fig.20]
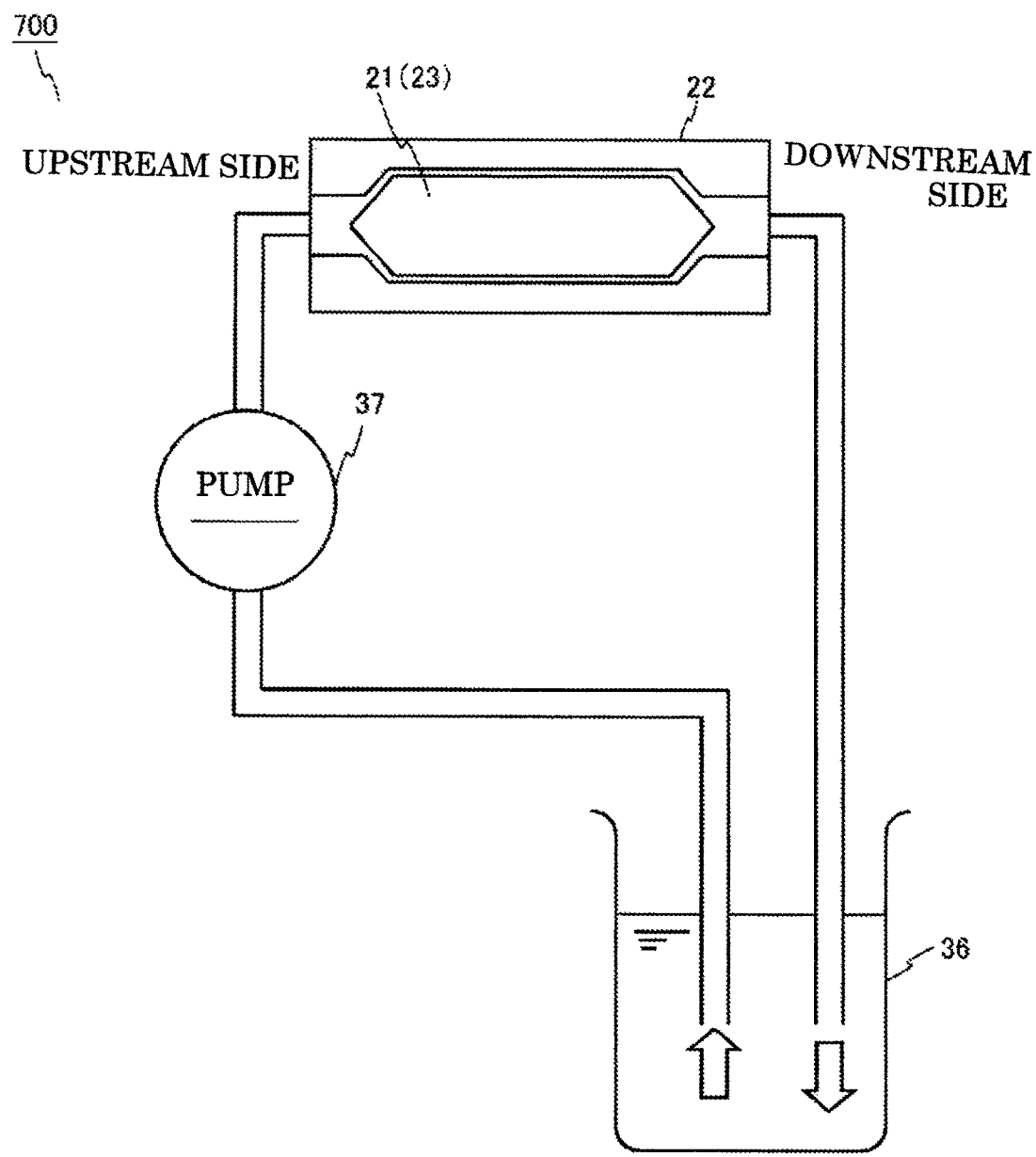

[Fig.21]
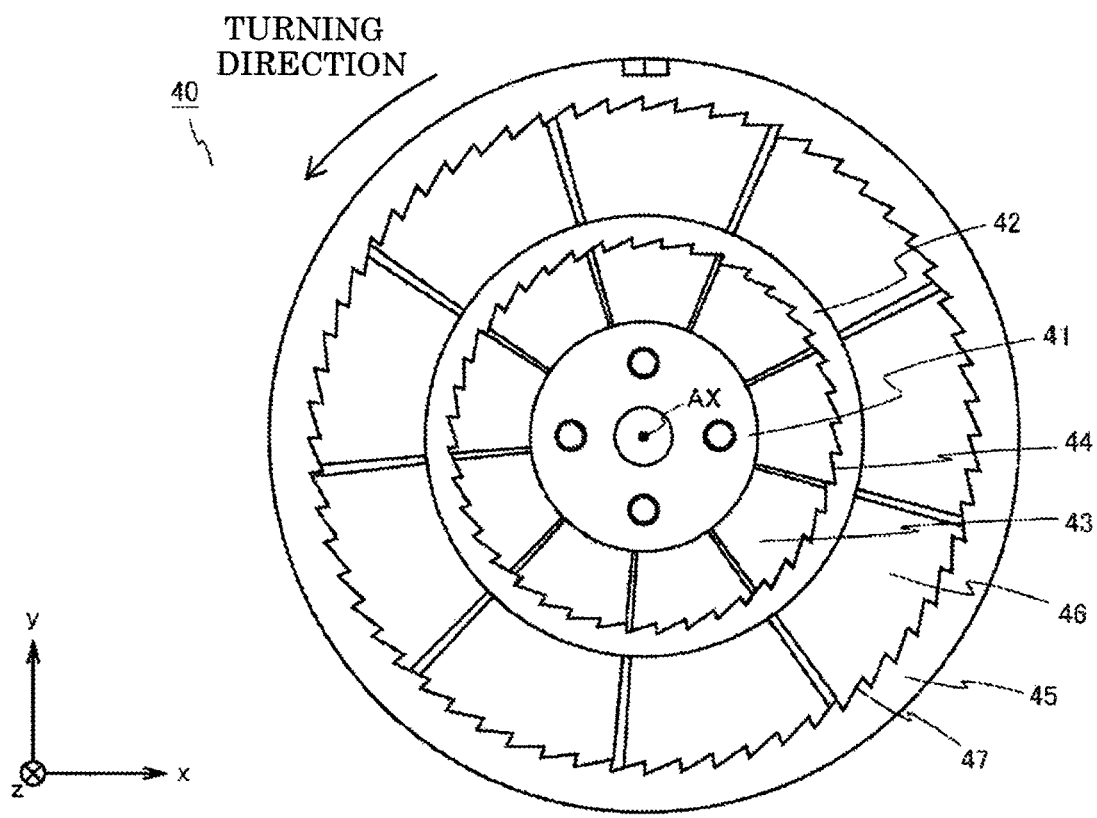
[Fig.22]
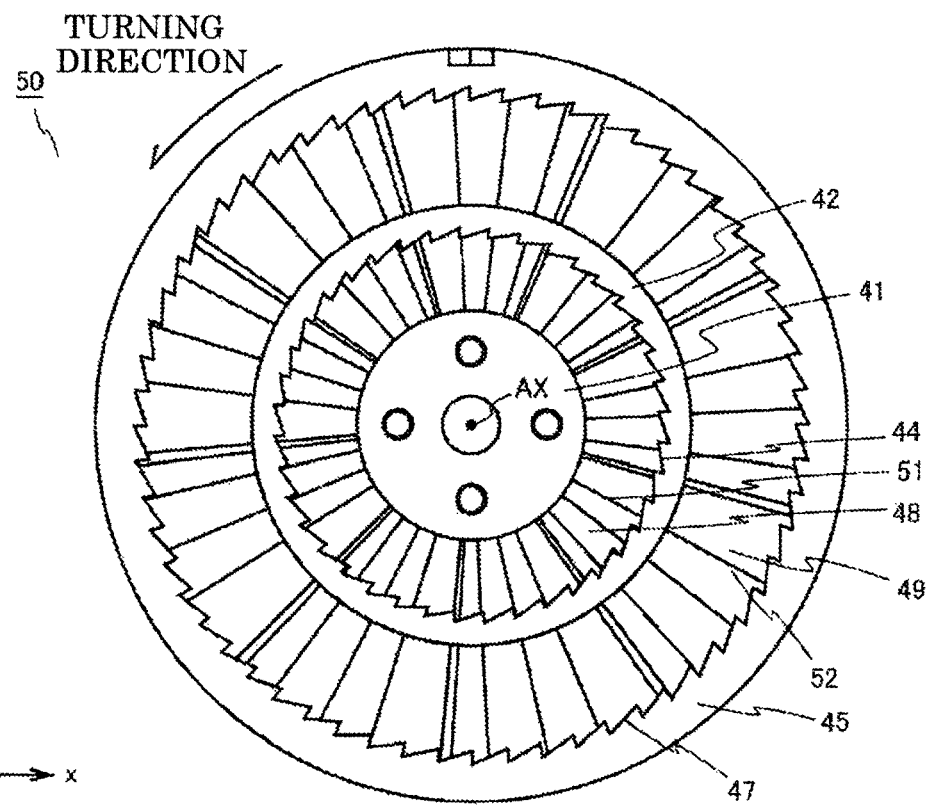

[Fig.23]
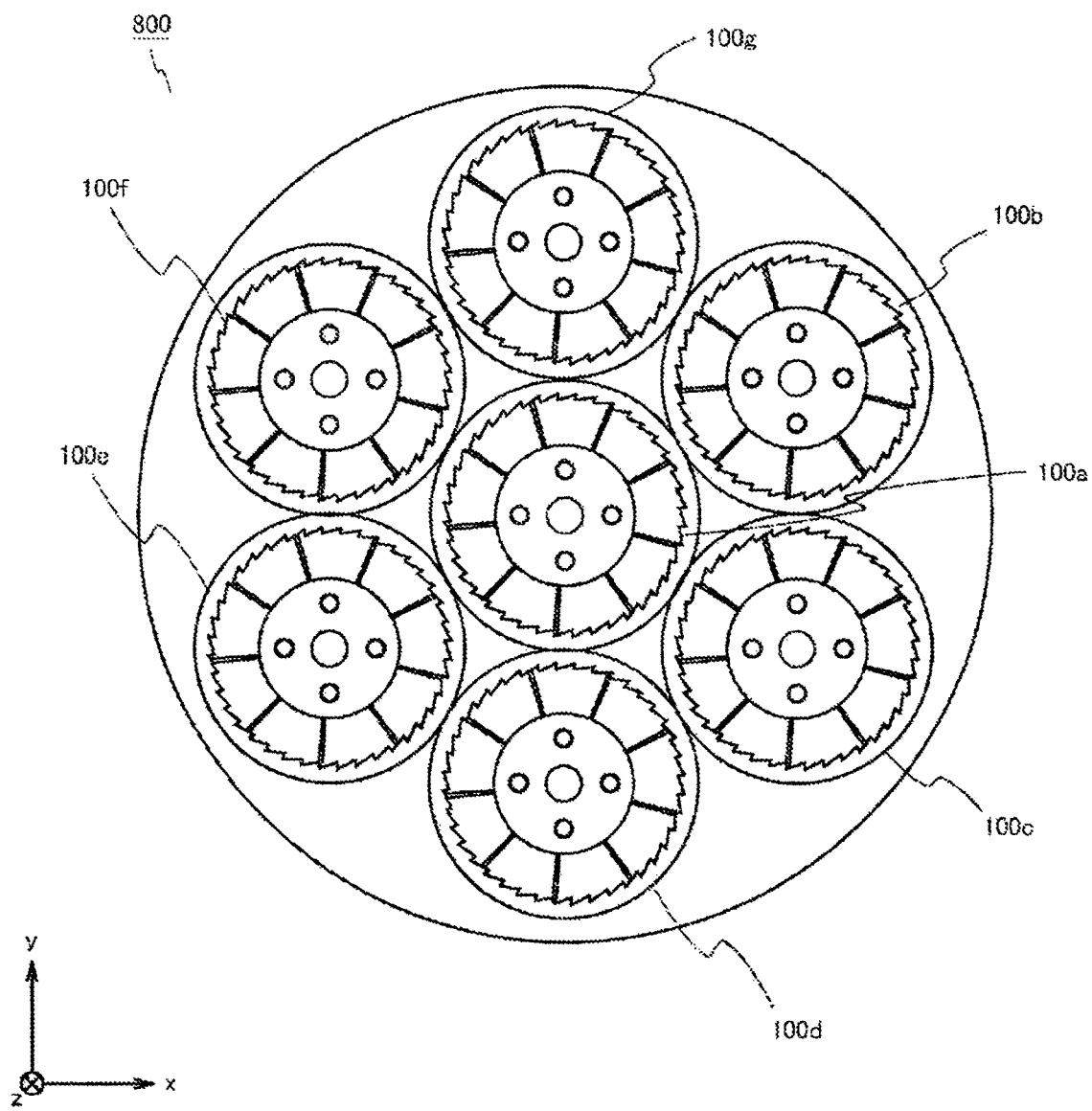

FLUID ACTIVATING DEVICE

CROSS REFERENCE TO RELATED APPLICATIONS

This application is a U.S. National Phase Application of PCT International Application No. PCT/JP2021/047701, filed Dec. 22, 2021, which claims benefit of priority from Japanese Patent Application No. 2021-003031, filed Jan. 12, 2021. The contents of these applications are incorporated herein by reference.

TECHNICAL FIELD

The present invention relates to a fluid activating device that activates fluid.

BACKGROUND ART

In recent years, techniques of generating fine bubbles called ultra-fine bubbles in a liquid, has attracted attention. The ultra-fine bubbles (called also ultra-fine nanobubbles) are extremely fine bubbles each having a sphere equivalent diameter of less than 1 μm, and exist stably in the liquid. Although the ultra-fine bubbles are colorless and transparent and cannot be directly found out by the naked eye, various kinds of technique for measuring particle size or number concentration have been developed. When ultra-fine bubbles are generated in a liquid, various kinds of effect can be obtained. Thus, use of the ultra-fine bubbles is studied in various fields such as fisheries, agriculture, medical care, food industry, and chemical industry. For example, when the ultra-fine bubbles are generated in a liquid, various obtainable effects are found out, the effects including biological growth promotion, sterilization, improvement in cleaning force, improvement in fuel combustion efficiency, and improvement in paint uniformity.

Patent Literature 1 discloses a device capable of generating ultra-fine bubbles in a liquid, the device including a blade body accommodated in a tubular housing pipe and provided with a shaft in a cylindrical columnar shape, the shaft having an outer peripheral surface provided with multiple blades. In Patent Literature 1 the blades are each provided with a bent part to generate a complex turbulent flow in the liquid flowing among the blades, thereby improving generation efficiency of ultra-fine bubbles.

PRIOR ART DOCUMENTS

Patent Literature 1: Japanese Patent No. 6490317

SUMMARY OF INVENTION

Technical Problem

It is an object of the present invention to provide a fluid activating device capable of efficiently activating fluid.

Means to Solve Problems

A fluid activating device according to the present invention includes a shaft in a cylindrical columnar shape, a tubular body provided with a hollow part to accommodate the shaft with a predetermined interval between an inner peripheral surface of the hollow part and an outer peripheral surface of the shaft, and multiple blades that are provided between the outer peripheral surface of the shaft and an inner peripheral surface of the tubular body while forming a flow path extending spirally from one end of the tubular body toward another end of the tubular body, and that generate a turbulent flow in fluid flowing in the flow path, and then a tubular peripheral wall has an inner peripheral surface provided with multiple ribs each composed of a ridge extending in an axial direction of the shaft.

Advantageous Effects of Invention

The present invention can provide a fluid activating device capable of efficiently activating fluid.

BRIEF DESCRIPTION OF DRAWINGS

FIG. 1 is a perspective view of a fluid activating device according to a first embodiment.
FIG. 2 is a perspective view of a constituting unit of the fluid activating device illustrated in FIG. 1.
FIG. 3 is a front view of the constituting unit illustrated in FIG. 2.
FIG. 4 is a back view of the constituting unit illustrated in FIG. 2.
FIG. 5 is a top face view of the constituting unit illustrated in FIG. 4.
FIG. 6 is a developed view of a section taken along line VI-VI illustrated in FIG. 3.
FIG. 7 is a perspective view of a constituting unit of a fluid activating device according to a second embodiment.
FIG. 8 is a front view of the constituting unit illustrated in FIG. 7.
FIG. 9 is a developed view of a section taken along line IX-IX illustrated in FIG. 8.
FIG. 10 is a perspective view of a constituting unit of a fluid activating device according to a modification of the second embodiment.
FIG. 11 is a front view of the constituting unit illustrated in FIG. 10.
FIG. 12 is a developed view of a section taken along line XII-XII illustrated in FIG. 11.
FIG. 13A is a partial sectional view of a fluid activating device according to a third embodiment.
FIG. 13B is a sectional view of the tubular body illustrated in FIG. 13A.
FIG. 14 is a section taken along lie XIV-XIV illustrated in FIG. 13A.
FIG. 15 is a partial sectioned view of a fluid activating device according to a modification of the third embodiment.
FIG. 16 is a partial sectioned view of a fluid activating device according to a fourth embodiment.
FIG. 17A is a sectional view of a fluid activating device according to a fifth embodiment.
FIG. 17B is a sectional view of a fluid activating device according to a modification 1 of the fifth embodiment.
FIG. 17C is a sectional view of a fluid activating device according to a modification 2 of the fifth embodiment.
FIG. 17D is a sectional view of a fluid activating device according to a modification 3 of the fifth embodiment.
FIG. 18 is a sectional view of a fluid activating device according to a sixth embodiment.
FIG. 19 is a schematic view of a fluid activating device according to a seventh embodiment.
FIG. 20 is a schematic view of a fluid activating device according to an eighth embodiment.
FIG. 21 is a schematic view of a constituting unit of a fluid activating device according to a ninth embodiment.

FIG. 22 is a schematic view of a constituting unit of a fluid activating device according to a modification of the ninth embodiment.

FIG. 23 is a schematic view of a fluid activating device according to a tenth embodiment.

DESCRIPTION OF EMBODIMENTS

The term, "fluid", is in this description referred to as a general term for liquid and gas. Then, when the fluid is a liquid, the term, "activating of fluid", is herein referred to as generation of many ultra-fine bubbles in the liquid. When the fluid is gas, the "activating of fluid" is herein referred to as reduction in size (the number of molecules) of a cluster that is an aggregation of a plurality of (e.g., several pieces to a few tens of pieces) gas molecules present in a vapor phase. When dissimilar gases are activated by a fluid activating device, a cluster of each gas is not only reduced in size, but also mixed uniformly. For example, when fuel gas and air (oxygen in air) are uniformly mixed in a molecule level or a cluster level, a cluster of the fuel gas and a cluster of the oxygen are uniformly distributed in a vapor phase. Thus, fuel gas molecules and oxygen molecules can be efficiently bound, so that combustion efficiency can be dramatically increased. Although a device configured to generate ultra-fine bubbles in liquid is exemplified in the description below, a fluid activating device according to each embodiment below is also applicable to activating of gas.

First Embodiment

FIG. 1 is a perspective view of a fluid activating device according to a first embodiment.

A fluid activating device 100 has a tubular shape as a whole, and activates a fluid supplied. The fluid activating device 100 is connected at some midpoint in piping such as a pipe or a tube while having a left end in FIG. 1 located upstream and right end in FIG. 1 located downstream.

The fluid activating device 100 includes a shaft 21 in a cylindrical columnar shape, a tubular body 22 that accommodates the shaft 21, multiple blades 3 that are provided between an outer peripheral surface of the shaft 21 and an inner peripheral surface of the tubular body 22. The fluid activating device 100 according to the present embodiment is formed by combining multiple units 10 each having the same shape. The multiple units 10 include respective multiple cores 1 that constitute the shaft 21, and respective multiple peripheral walls 2 that constitute the tubular body 22. The tubular body 22 includes a hollow part in which the shaft 21 is accommodated. As illustrated in FIG. 1, the inner peripheral surface of the tubular body 22 is provided with multiple ribs 24 formed of respective ridges extending in an axial direction of the shaft 21. The multiple ribs 24 are formed of multiple protrusions 4 of the respective multiple units 10.

Hereinafter, details of the unit 10 will be described with reference to FIGS. 2 to 6.

FIG. 2 is a perspective view of a component unit of the fluid activating device illustrated in FIG. 1. FIG. 3 is a front view of the component unit illustrated in FIG. 2, and FIG. 4 is a back view of the component unit illustrated in FIG. 2. FIG. 5 is a top face view of the component unit illustrated in FIG. 4. FIG. 6 is a developed view of a section taken along line VI-VI illustrated in FIG. 3. Subsequent drawings may specify a direction in an xyz coordinate system. A positive direction of a z-axis corresponds to a flow direction of fluid.

The unit 10 includes the core 1, the peripheral wall 2, and the multiple blades 3. The unit 10 can be formed by injection molding of a resin, for example.

The core 1 is a cylindrical columnar member. The core 1 includes a through-hole 5, a boss 6, and a recess 7. On an upstream surface and a downstream surface of the core 1, there are provided with recesses 8 and 9 to reduce the amount of resin.

The through-hole 5 is a circular hole passing through the center of the core 1. The through-hole 5 is formed to constitute a flow path passing through the fluid activating device 100 along a central axis of the fluid activating device 100 when the fluid activating device 100 is formed by connecting the multiple cores 1 as illustrated in FIG. 1. This flow path is provided to enable a fluid having flowed out of the fluid activating device 100 (a fluid containing many ultra-fine bubbles) to be supplied with another liquid or gas. When another liquid or gas is not required to be injected into the fluid, the through-hole 5 may be closed or may not be provided.

The boss 6 is provided on one of both surfaces of the core 1, the one being upstream of the fluid activating device 100 (FIG. 3). Then, the recess 7 is provided on the other of the both surfaces of the core 1, the other being downstream of the fluid activating device 100 (FIG. 4). The boss 6 and the recess 7 have shapes that can be fitted to each other, and are provided to connect the cores 1 adjacent to each other. The recess 7 is disposed at a position rotated by a predetermined angle about a central axis AX of the core 1 with respect to the boss 6. That is, when the core 1 is viewed in plane view from an upstream side or a downstream side of the fluid activating device 100, the boss 6 is provided at a rotational position without overlapping the recess 7. Instead of the configuration of the present embodiment, the recess 7 may be provided on the upstream surface of the core 1, and the boss 6 may be provided on the downstream surface of the core 1. As long as the cores 1 adjacent to each other can be connected to each other, fitting parts constituting a fitting structure other than the boss 6 and the recess 7 may be provided on the corresponding upstream and downstream surfaces of the cores 1. When the cores 1 are bonded to each other with an adhesive or the like, the fitting parts may not be provided.

The peripheral wall 2 is a tubular or annular member coaxial with the core 1. The peripheral wall 2 surrounds the core 1 with a predetermined interval from an outer peripheral surface of the core 1. The peripheral wall 2 has an outer surface provided with a first positioning part 11 and a second positioning part 12 (FIGS. 3 to 5). The first positioning part 11 and the second positioning part 12 are provided to enable relative rotational positions of the cores 1 adjacent to each other to be easily aligned when the cores 1 are combined. Details of the first positioning part 11 and the second positioning part 12 will be described later. The peripheral wall 2 has an inner peripheral surface provided with multiple protrusions 4. The protrusions 4 are each formed of a ridge extending in a direction along the central axis AX of the core 1. As illustrated in FIGS. 3 and 4, each protrusion 4 has a triangular section parallel to a plane (referred to below as an "xy plane") orthogonal to the central axis AX of the core 1. The multiple protrusions 4 are provided without any gap throughout the peripheral wall 2 in its circumferential direction, and the multiple protrusions 4 have a section in a plane parallel to the xy plane, the section being in a saw blade shape. As illustrated in FIGS. 3 and 4, the protrusions 4 are provided on both an upstream side (front surface side) and a downstream side (back surface side) across the blades 3.

The protrusions 4 each have such a height, a size of a vertex angle, and a length of each of two sides excluding a base in the section parallel to the xy plane, that are not particularly limited and can be set based on viscosity and a flow rate of fluid supplied to the fluid activating device 100, pressure applied to the fluid, an allowable pressure loss, and the like. The height of each of the protrusions 4 refers to a maximum height of the protrusion 4 in a radial direction of the peripheral wall 2 in the section parallel to the xy plane. The size of the vertex angle and the length of each of the two sides excluding the base also refer to values in the section parallel to the xy plane. The protrusion 4 may have a sectional shape other than a triangular shape. For example, the protrusion 4 has inclined surfaces one of which may be a curved surface or each of which may be a curved surface.

The multiple blades 3 turn fluid flowing in a space between the outer peripheral surface of the core 1 and the inner peripheral surface of the peripheral wall 2 about the central axis AX of the core 1. The multiple blades 3 are members that generate ultra-fine bubbles by generating a turbulent flow in the fluid. Each of the blades 3 connects the outer peripheral surface of the core 1 and the inner peripheral surface of the peripheral wall 2. Although the blade 3 may be connected to any one of the outer peripheral surface of the core 1 and the inner peripheral surface of the peripheral wall 2, the blade 3 is improved in strength by being connected to both the outer peripheral surface of the core 1 and the inner peripheral surface of the peripheral wall 2. Each of the blades 3 is provided at a constant pitch in a circumferential direction of the core 1. Each of the blades 3 is disposed while being inclined at a predetermined angle with respect to the central axis AX of the core 1. Specifically, each of the blades 3 is inclined with a perpendicular distance from a plane P including the upstream surface of the core 1 to a front surface (upstream surface) of the blade 3, the perpendicular distance increasing toward a turning direction (in a counterclockwise direction about the central axis AX of the core 1 when viewed from the upstream side in the present embodiment) of the flow path (FIG. 6). The blades 3 are each equal in inclination angle. The front surface of the blade 3 may be a flat surface or a curved surface. As illustrated in FIG. 6, the blade 3 includes a main surface part 13 in the shape of a flat plate and a bent part 14 provided along a downstream end edge of the main surface part in the present embodiment. The main surface part 13 has an upstream end edge that is preferably formed in the shape of a thin blade to reduce fluid resistance. The bend part 14 generates a turbulent flow (vortex) in the fluid flowing along a downstream surface of the blade 3. It is considered that ultra-fine bubbles are generated by the turbulent flow generated by the bent part 14. The number and inclination angle of the blades 3 are not particularly limited, and can be set based on viscosity and a flow rate of fluid supplied to the fluid activating device 100, pressure applied to the fluid, an allowable pressure loss, and the like.

The fluid activating device 100 will be described again with reference to FIG. 1.

The fluid activating device 100 illustrated in FIG. 1 is formed by connecting the multiple units 10 in the direction along the central axis AX of the core 1. As described above, the boss 6 and the recess 7 are provided on the upstream surface (FIG. 3) and the downstream surface (FIG. 4) of the core 1, respectively. Thus, two units 10 can be coupled by fitting the boss 6 of one of the two units 10 into the recess 7 of the other of the two units 10. The fluid activating device 100 can be formed by sequentially coupling another unit to the coupled units 10. The number of the units 10 constituting the fluid activating device 100 is not particularly limited.

The recess 7 is disposed at a rotational position rotated by a predetermined angle about the central axis AX of the core 1 with respect to the boss 6. Thus, when the multiple units 10 are coupled by fitting of the corresponding bosses 6 and recesses 7, each of the multiple units 10 is disposed by being rotated by a certain rotation angle in a certain rotation direction about the central axis AX of the core 1 in order from the upstream side toward the downstream side of the fluid activating device 100. For example, FIG. 1 illustrates the example in which the unit 10 downstream side of the two units 10 adjacent to each other can be disposed at a position rotated counterclockwise by $27.5°$ about the central axis of the core 1 with respect to the unit 10 upstream side when viewed from the upstream side. As described above, when the multiple units 10 are coupled by being rotated by a certain rotation angle in a certain rotation direction in order from the upstream side to the downstream side of the fluid activating device, a rotational position of the blade 3 provided in each of the multiple units 10 is shifted by the certain rotation angle for each unit 10. When the blade 3 of each unit 10 is disposed by being shifted in the rotation direction by the certain rotation angle, a flow path extending spirally from the upstream side toward the downstream side of the fluid activating device 100 is formed inside the tubular body 22 (peripheral wall 2).

As illustrated in FIGS. 3 to 5, the outer peripheral surface of the peripheral wall 2 is provided with the first positioning part 11 and the second positioning part 12. When viewed from the upstream side of the unit 10, the second positioning part 12 is provided at a rotational position rotated counterclockwise by a certain angle about the central axis AX of the core 1 with respect to the first positioning part 11. Thus, when a pair of units 10 adjacent to each other is coupled, the second positioning part 12 of one of the units 10 on the upstream side and the first positioning part 11 of the other of the units 10 on the downstream side are disposed at the same rotational position as illustrated in FIG. 1. As a result, the unit 10 on the downstream side can be disposed at the rotational position rotated by a certain rotation angle in a certain rotation direction with respect to the unit 10 on the upstream side. The first positioning part 11 and the second positioning part 12 have a relative rotation angle about the central axis AX that is set equal to a relative rotation angle of the recess 7 about the central axis AX with respect to the boss 6. Thus, when the second positioning part 12 of the unit 10 on the upstream side and the first positioning part 11 of the unit 10 on the downstream side are aligned, the recess 7 of the unit 10 on the upstream side and the boss 6 of the unit 10 on the downstream side are in a positional relationship of being able to be fitted to each other.

That is, when the rotational positions of the second positioning part 12 of the unit 10 on the upstream side and the first positioning part 11 of the unit 10 on the downstream side are aligned, the units can be disposed while being shifted in the same direction by a designed certain rotation angle, and the boss 6 and the recess 7 can also be aligned. The multiple units 10 coupled may be fixed with an adhesive, a fixture, or the like.

The fluid activating device 100 is attached at some midpoint in piping in use. When gas is mixed at an outlet part of the fluid activating device 100, a supply pipe for supplying gas is connected to the flow path formed by the through-hole 5 provided in the core 1. When no gas is introduced, the flow path formed by the through-hole 5 is closed.

To the fluid activating device 100, a fluid is supplied from an upstream pipe. The fluid may be a liquid or a gas. Multiple types of fluid may be supplied together. When the multiple types of fluid are supplied, the multiple types of fluid can be uniformly mixed by operation of the fluid activating device. When fluids are mixed, dissimilar liquids may be supplied, dissimilar gases may be supplied, or liquid and gas may be supplied. Hereinafter, an example will be described in which the fluid is a liquid and ultra-fine bubbles are generated in the liquid.

The fluid supplied to a space surrounded by the core 1 and the peripheral wall 2 passes between the blades 3 adjacent to each other in the circumferential direction and flows to the unit 10 on the downstream side. At this time, ultra-fine bubbles are generated in the fluid by a turbulent flow generated by the bent part 14 of the blade 3 illustrated in FIG. 6. As described above, the rotational position of the blade 3 of each unit is shifted by a certain angle in the counterclockwise direction about the central axis AX as viewed from the upstream side in order from the upstream side to the downstream side, so that spaces between the blades 3 adjacent to each other in the circumferential direction are sequentially connected to form a flow path extending in a counterclockwise spiral shape. The fluid collides with the bent part 14 of the blade 3 multiple times while flowing through the flow path in a spiral shape, so that ultra-fine bubbles are repeatedly generated.

As the fluid passes through the flow path in a spiral shape, a swirling flow in a half-clockwise is generated. When the swirling flow is generated, a centrifugal force acts on the fluid. Thus, the fluid collides with the inner peripheral surface of the peripheral wall 2 with a strong force. The fluid activating device 100 according to the present embodiment is provided with the multiple protrusions 4 on the inner peripheral surface of the peripheral wall 2. When the fluid collides with each of the protrusion 4, a turbulent flow (vortex) is generated near a ridgeline of the protrusion 4. Thus, ultra-fine bubbles are further generated by this turbulent flow.

As described above, the multiple protrusions 4 (ribs 24) are provided inside the peripheral wall 2 (tubular body 22) in the present embodiment, so that ultra-fine bubbles can be generated not only by collision between the fluid and the blade 3 but also by collision between the fluid and the protrusions 4 (ribs 24). The multiple blades 3 generates a swirling flow, so that a centrifugal force acts on the fluid flowing near the inner peripheral surface of the peripheral wall 2. By providing the multiple protrusions 4 on the inner peripheral surface of the peripheral wall 2, a centrifugal force operating on the fluid can be used, so that generation efficiency of ultra-fine bubbles can be improved.

The multiple protrusions 4 (ribs 24) in the present embodiment each have a height that monotonously increases to a predetermined height in the turning direction of the flow path in a spiral shape, and that then rapidly decreases at a part of the ridgeline. In other words, the height of each of the protrusions 4 (rib 24) increases from a connection part between corresponding one of the protrusions 4 (rib 24) and the rib adjacent upstream to the corresponding one in the turning direction of the flow path in a spiral shape, to a connection part between the corresponding one of the protrusions 4 (rib 24) and the rib adjacent downstream to the corresponding one in the turning direction of the flow path in a spiral shape. Thus, a step is generated at the connection part between the corresponding one of the protrusions 4 (rib 24) and the rib adjacent downstream to the corresponding one in the turning direction of the flow path in a spiral shape. The protrusion 4 (rib 24) in the present embodiment has a triangular section taken along a plane orthogonal to the central axis AX of the core. The protrusions 4 (rib 24) are provided on the entire inner peripheral surface of the peripheral wall 2 without any gap. The shape and placement of each of the protrusions 4 as described above improve the generation efficiency of ultra-fine bubbles.

The core 1 includes the boss 6 and the recess 7 that are provided in a positional relationship in which the boss 6 and the recess 7 are rotated from each other by a certain angle. Thus, when a pair of units 10 adjacent to each other is coupled by fitting of the boss 6 and the recess 7, the blade 3 of one of the units 10 and the blade 3 of the other of the units 10 can be disposed while being shifted by a predetermined angle. As a result, the unit 10 according to the present embodiment allows the fluid activating device 100 to be easily assembled.

When the pair of units 10 adjacent to each other is coupled, the second positioning part 12 provided in the unit 10 on the upstream side and the first positioning part 11 provided in the unit 10 on the downstream side are disposed at the same rotational position in the circumferential direction of the peripheral wall 2. This configuration enables the blade 3 of the unit 10 on the upstream side and the blade 3 of the unit 10 on the downstream side to be disposed while being shifted by a predetermined angle. Additionally, the first positioning part 11 and the second positioning part 12 correspond to relative rotational positions of the boss 6 and the recess 7, so that the boss 6 and the recess 7 are easily aligned in a positional relationship of being able to be fitted to each other based on the first positioning part 11 and the second positioning part 12. Thus, the first positioning part 11 and the second positioning part 12 enable assembly of the fluid activating device 100 to be further facilitated.

Second Embodiment

FIG. 7 is a perspective view of a component unit of a fluid activating device according to a second embodiment. FIG. 8 is a front view of the component unit illustrated in FIG. 7. FIG. 9 is a developed view in which a section taken along line IX-IX illustrated in FIG. 8 is developed on a plane. Hereinafter, differences between the present embodiment and the first embodiment will be mainly described.

The fluid activating device according to the present embodiment is formed by combining multiple units 20. Each unit 20 includes multiple blades 15 each having a shape different from that of the first embodiment. As illustrated in FIGS. 7 to 9, each blade 15 has a front surface and a back surface that are each provided with multiple protrusions 16 extending in a radial direction of the unit 20. As illustrated in FIG. 9, each of the protrusions 16 has a triangular section. When the multiple protrusions 16 are provided on the front surface and the back surface of the blade 15, the blade has a section in a saw blade shape. Although the protrusions 16 may be provided on one of the front surface and the back surface of the blade 15, generation efficiency of ultra-fine bubbles can be further improved by providing the projections 16 on both the surfaces of the blade 15.

As in the first embodiment, the multiple units 20 are coupled in a direction along a central axis AX to constitute the fluid activating device. Fluid supplied to a space between a shaft composed of a core 1 and a tubular body composed of a peripheral wall 2, flows downstream along the front surface and the back surface of the blade 15. At this time, the fluid collides with the multiple protrusions 16 provided on the front and back surfaces of the blade 15, so that a turbulent flow is generated near a ridgeline of each protrusion 16, and then many ultra-fine bubbles are generated by the turbulent flow. The multiple protrusions 16 provided on the front and back surfaces of the blade 15 enables the generation efficiency of ultra-fine bubbles of using the blade 15 to be improved. As in the first embodiment, the fluid collides with protrusions 4 provided on an inner peripheral surface of the peripheral wall 2, to generate microbubbles. Thus, the present embodiment can provide a fluid activating device being excellent in generation efficiency of ultra-fine bubbles.

As illustrated in FIG. 9, the unit 20 according to the present embodiment includes the blade 15 provided with the protrusions 16 that are each formed with such a thickness increasing in a turning direction of a flow path in a spiral shape formed by the blades 15, to a predetermined thickness, the thickness then rapidly decreasing at a connection part with the protrusion 16 adjacent to corresponding one of the protrusions 16. As illustrated in FIGS. 7 and 8, each of the protrusions 4 provided on the inner peripheral surface of the peripheral wall 2 is formed with a height in a radial direction of the peripheral wall 2, the height increasing in the turning direction of the flow path in a spiral shape formed by the blades 15 to a predetermined height, the height then rapidly decreasing at a connection part with the protrusion 4 adjacent to corresponding one of the protrusions 4. This configuration allows the fluid to flow along inclined surfaces of the protrusions 4 and 16, and a step to be formed at a position beyond a ridgeline of each of the protrusions 4 and 16, so that a strong turbulent flow is generated at the step. Thus, the using of a combination of shapes of the protrusions 4 and 16 illustrated in FIGS. 7 to 9 causes extremely excellent generation efficiency of ultra-fine bubbles.

Modification of the Second Embodiment

FIG. 10 is a perspective view of a component unit of a fluid activating device according to a modification of the second embodiment. FIG. 11 is a top view of the component unit illustrated in FIG. 10. FIG. 12 is a developed view in which a section taken along line XII-XII illustrated in FIG. 11 is developed on a plane.

The fluid activating device according to the present modification is formed by combining multiple units 30. Although the unit 30 includes blades 18 each having a section in a saw blade shape as in the second embodiment, protrusions 4 provided on a peripheral wall 2 and protrusions 19 provided on each of the blades 18 are different in shape from those in the second embodiment.

More specifically, the unit 30 according to the present modification includes the protrusions 19 each extending in a radial direction of the peripheral wall 2 and being provided on a front surface and a back surface of each of the blades 18. As illustrated in FIG. 12, the protrusions 19 are each formed with a thickness decreasing from a predetermined thickness in a turning direction of a flow path in a spiral shape formed by the blades 18, and the thickness then rapidly increasing to the predetermined thickness at a connection part with the protrusion 19 adjacent to corresponding one of the protrusions 19. Additionally, the peripheral wall 2 has an inner peripheral surface provided with protrusions 17 that are each formed with a height in a radial direction of the peripheral wall 2, the height decreasing from a predetermined height in the turning direction of the flow path in a spiral shape formed by the blades 15, and the height then rapidly increasing to the predetermined height at a connection part with the protrusion 17 adjacent to corresponding one of the protrusions 17. When these protrusions 17 and 19 are provided, fluid collides with steps formed by the protrusions 17 and 19 to generate a turbulent flow. Thus, generation efficiency of ultra-fine bubbles can be improved as compared with when the protrusions 17 and 19 are not provided. However, the using of the combination of protruding shapes of the present modification causes flow velocity of fluid to be likely to decrease due to the collision with the steps, so that the generation efficiency of ultra-fine bubbles decreases as compared with the combination of protruding shapes in the second embodiment illustrated in FIGS. 7 to 9. But, a combination of a sectional shape of the protrusion provided on the peripheral wall (tubular body) and a sectional shape of the protrusion provided on the blade, is not particularly limited. For example, the protrusion 4 according to the second embodiment and the protrusion 19 according to the modification may be combined, or the protrusion 17 according to the modification and the protrusion 16 according to the second embodiment may be combined.

Third Embodiment

FIG. 13A is a sectioned view of a part of a fluid activating device according to a third embodiment. FIG. 13B is a sectional view of the tubular body illustrated in FIG. 13A. FIG. 14 is a sectional view taken along line XIV-XIV illustrated in FIG. 13A.

The fluid activating device 200 includes a shaft 21 in a cylindrical columnar shape, a tubular body 22 that accommodates the shaft 21, multiple blades 23 that are provided between an outer peripheral surface of the shaft 21 and an inner peripheral surface of the tubular body 22. The tubular body 22 includes a hollow part in which the shaft 21 is accommodated. As illustrated in FIGS. 13B and 14, the inner peripheral surface of the tubular body 22 is provided with multiple ribs 24 formed of respective ridges extending in an axial direction of the shaft 21. Between the outer peripheral surface of the shaft 21 and the inner peripheral surface of the tubular body 22, a space for disposing the blades 23 is formed.

Each of the blades 23 is provided while being inclined at a predetermined angle with respect to the central axis of the shaft 21, as in each of the above embodiments. Although the blade 23 has the same shape as that illustrated in FIG. 6, the blade 23 may be formed in a saw blade shape as in the second embodiment. The blades 23 are disposed at predetermined intervals in a circumferential direction and an axial direction of the shaft 21. The multiple blades 23 adjacent in the axial direction of the shaft 21 are disposed in the fluid activating device 200 from upstream to downstream while being rotated by a certain rotation angle in a certain rotation direction about the central axis of the shaft 21. This placement of the blades 23 forms a flow path that extends spirally in the fluid activating device 200 from upstream to downstream.

Although the shaft 21, the tubular body 22, and the blade 23 are not particularly limited in material, they can be made of resin or metal, for example. The shaft 21 and the blade 23 may be integrally formed by shaving or the like, or may be formed as separate members and joined to each other.

The shaft 21 is provided at its upstream end and downstream end with flow straightening members 25a and 25b each in a conical shape, respectively. The flow straightening member 25a is configured to allow supplied fluid to smoothly flow into the flow path formed by the blades 23. The flow straightening member 25b is configured to smoothly guide fluid to downstream, the fluid flowing out from the flow path formed by the blades 23. The flow straightening members 25a and 25b are not necessarily required, and may not be provided.

The fluid activating device 200 according to the present embodiment also allows a bent part provided in each of the blades 23 to generate a turbulent flow in the fluid flowing through the flow path formed by the blades 23, thereby generating ultra-fine bubbles. Although centrifugal force is generated in the fluid flowing through the flow path in a spiral shape formed by the blades 23, generation efficiency of ultra-fine bubbles can be improved by the multiple ribs 24 provided on the inner peripheral surface of the tubular body 22.

FIG. 15 is a sectioned view of a part of a fluid activating device according to a modification of the third embodiment.

The fluid activating device 200 may be provided with a flow straightening member 26 illustrated in FIG. 15 instead of the flow straightening member 25a illustrated in FIG. 13A. The flow straightening member 26 includes a base part in a conical shape and a blade in a spiral shape provided on a conical surface of the base part. The turning direction of the blade in a spiral shape is identical to the turning direction of the flow path formed by the blades 23. Providing the flow straightening member 26 illustrated in FIG. 15 enables the fluid flowing into the fluid activating device 200 to be more efficiently straighten. Although not illustrated in FIG. 15, a flow straightening member identical in shape may also be provided downstream.

Fourth Embodiment

FIG. 16 is a sectioned view of a part of a fluid activating device according to a fourth embodiment.

A fluid activating device 300 includes a flow straightening member 27 in a conical shape having a shaft part 28, multiple spacers 29, multiple blade plates 38 having multiple blades 23, and a tubular body 22. The multiple spacers 29 and the multiple blade plates 38 are integrated with having openings (not illustrated) provided at their centers through which the shaft part 28 passes. The multiple spacers 29 and the multiple blade plates 38 are partly integrated in the present embodiment to constitute a shaft 21. Each of the blade plates 38 can be formed by pressing a metal plate, for example. Although each of the blades 23 provided on the blade plate 38 has the same shape as that illustrated in FIG. 6, each of the blades 23 may be formed in a saw blade shape as in the second embodiment.

The present embodiment also provides multiple ribs (not illustrated) on an inner peripheral surface of the tubular body 22, so that generation efficiency of ultra-fine bubbles can be improved by the multiple ribs.

The present embodiment enables the number of ultra-fine bubbles generated to be adjusted by appropriately adjusting the number of spacers 29 and blade plates 38.

Fifth Embodiment

FIG. 17A is a sectional view of a fluid activating device according to a fifth embodiment.

A fluid activating device 400 further includes a supply pipe 31a for supplying gas. The supply pipe 31a passes through a through-hole provided at the center of the shaft 21 from upstream to downstream, and has an end part disposed near a downstream end of the shaft 21.

When fluid is supplied to the fluid activating device 400, the supply pipe 31a is depressurized due to a flow of the fluid. Thus, gas is drawn into the fluid through the supply pipe 31a. The gas drawn from the supply pipe 31a is caught in a swirling flow of the fluid near a downstream end part of the fluid activating device 400, and is introduced into the fluid as microbubbles having a diameter in a range of 1 μm to 100 μm or bubbles having a size larger the range, for example.

FIG. 17B to 17D are sectional views of fluid activating devices according to modifications 1 to 3 of the fifth embodiment, respectively.

The modification 1 illustrated in FIG. 17B includes a supply pipe 31b that does not pass through the shaft 21 and that is provided downstream the shaft 21. The supply pipe 31b has an end part disposed near the downstream end of the shaft 21. This configuration also enables gas supplied from the supply pipe 31b along with supply of the fluid, to be taken into the fluid as microbubbles or bubbles having a larger size than the microbubbles.

The modification 2 illustrated in FIG. 17C includes a flow path in an L-shape provided in the shaft 21, the flow path passing through a central part of the shaft 21 from upstream side end and reaching an outer peripheral surface of the shaft 21, and an end part of a supply pipe 31c is disposed in the flow path in an L-shape. When fluid is supplied to the fluid activating device 400, gas drawn from the supply pipe 31c is caught in a swirling flow formed by the blades 23 and taken into the fluid as ultra-fine bubbles. This configuration can obtain a fluid containing ultra-fine bubbles of gas at high concentration, the gas being supplied from the supply pipe 31c.

The modification 3 illustrated in FIG. 17D includes a supply pipe 31d having an end part disposed upstream of an upstream end of the shaft 21. Gas is supplied to the supply pipe 31d by a pump. The gas supplied from the supply pipe 31d is caught in a swirling flow formed by the blades 23 and taken into fluid as ultra-fine bubbles. This configuration also can obtain a fluid containing ultra-fine bubbles of gas at high concentration, the gas being supplied from the supply pipe 31d.

The fluid activating device 400 illustrated in each of FIGS. 17A to 17D also includes multiple ribs (not illustrated) provided on an inner peripheral surface of a tubular body 22. Thus, generation efficiency of ultra-fine bubbles can be improved by the multiple ribs by using a centrifugal force acting on the fluid, as in each of the above embodiments.

The fluid activating device illustrated in each of FIGS. 17A to 17D is not particularly limited in type of gas to be supplied. The fluid activating device illustrated in each of FIGS. 17A to 17D may have any one of the configurations described in the first to fourth embodiments.

Sixth Embodiment

FIG. 18 is a sectional view of a fluid activating device according to a sixth embodiment.

A fluid activating device 500 further includes a drive 32 for rotating a shaft 21. The drive 32 is a motor, for example. When the shaft 21 is rotated while the fluid is supplied to the fluid activating device 500, the number of times of passage of the blade 23 per unit time can be increased. Thus, generation of ultra-fine bubbles can be promoted. The fluid activating device 500 illustrated in FIG. 18 also includes multiple ribs (not illustrated) provided on an inner peripheral surface of a tubular body 22. Thus, generation efficiency of ultra-fine bubbles can be improved by the multiple ribs by using a centrifugal force acting on the fluid, as in each of the above embodiments.

Seventh Embodiment

FIG. 19 is a schematic view of a fluid activating device according to a seventh embodiment.

A fluid activating device 600 includes a shaft 21, a tubular body 22, and blades 23, which are accommodated in an accommodation part 33, and a motor 34 attached to the shaft 21. The accommodation part 33 is provided with an inflow pipe 35a into which fluid flows and an outflow pipe 35b from which the fluid is guided to the outside. The present embodiment also enables ultra-fine bubbles to be efficiently generated by rotating the shaft 21 with the motor 34. The fluid activating device 600 illustrated in FIG. 19 also includes multiple ribs (not illustrated) provided on an inner peripheral surface of the tubular body 22. Thus, generation efficiency of ultra-fine bubbles can be improved by the multiple ribs by using a centrifugal force acting on the fluid, as in each of the above embodiments.

Eighth Embodiment

FIG. 20 is a schematic view of a fluid activating device according to an eighth embodiment.

A fluid activating device 700 includes a shaft 21, a tubular body 22, blades 23, a reservoir 36, and a pump 37. Fluid in the reservoir 36 is supplied into the tubular body 22 by the pump 37, and the fluid discharged from the tubular body 22 is returned to the reservoir 36. When the fluid in the reservoir 36 is circulated to repeatedly supply the fluid to the tubular body 22, ultra-fine bubbles can be improved in concentration. The fluid activating device 700 illustrated in FIG. 20 also includes multiple ribs (not illustrated) provided on an inner peripheral surface of the tubular body 22. Thus, generation efficiency of ultra-fine bubbles can be improved by the multiple ribs by using a centrifugal force acting on the fluid, as in each of the above embodiments.

Ninth Embodiment

FIG. 21 is a schematic view of a constituting unit of a fluid activating device according to a ninth embodiment.

A unit 40 has a structure in which a unit 10 is nested in a part corresponding to a core 1 of the unit 10 according to the first embodiment.

The unit 40 includes a core 41, a first peripheral wall 42, multiple first blades 43, multiple first protrusions 44, a second peripheral wall 45, multiple second blades 46, and multiple second protrusions 47.

The core 41 is a cylindrical columnar member. As in the first embodiment, the core 41 may be provided in its central part with a through-hole. The first peripheral wall 42 is a tubular or annular member coaxial with the core 41. The first peripheral wall 42 surrounds the core 41 with a predetermined interval from an outer peripheral surface of the core 41. The multiple first blades 43 are each identical in shape to the blade 3 (FIG. 6) of the first embodiment, and are connected to the outer peripheral surface of the core 41 and an inner peripheral surface of the first peripheral wall 42. As with the blades 3 described above, the multiple blades 43 constitute a flow path extending spirally in a first tubular body composed of multiple first peripheral walls 42, to cause fluid flowing between the core 41 and the first peripheral wall 42 to turn about a central axis AX of the core 41. The multiple first blades 43 generate ultra-fine bubbles by generating a turbulent flow in the fluid. The multiple first protrusions 44 are each a ridge extending in a direction along the central axis AX of the core 1, and are formed similarly to the protrusions 4 of the first embodiment. The multiple first protrusions 44 are provided without any gap throughout the first peripheral wall 42 in its circumferential direction.

The second peripheral wall 45 surrounds the first peripheral wall 42 with a predetermined interval from an outer peripheral surface of the first peripheral wall 42. The multiple second blades 46 are each identical in shape to the blade 3 (FIG. 6) of the first embodiment, and are connected to the outer peripheral surface of the first peripheral wall 42 and an inner peripheral surface of the second peripheral wall 45. As with the blades 3 described above, the multiple second blades 46 constitute a flow path extending spirally in a second tubular body composed of multiple second peripheral walls 45, to cause fluid flowing between the first peripheral wall 42 and the second peripheral wall 45 to turn about the central axis AX of the core 41. The multiple second blades 46 generate ultra-fine bubbles by generating a turbulent flow in the fluid. The multiple second protrusions 47 are each a ridge extending in a direction along the central axis AX of the core 1, and are formed similarly to the protrusions 4 of the first embodiment. The multiple second protrusions 47 are provided without any gap throughout the second peripheral wall 45 in its circumferential direction.

The unit 40 may be provided with the first positioning part 11 and the second positioning part 12 described in the first embodiment. The unit 40 may be also provided with the boss 6 and the recess 7 described in the first embodiment.

The fluid activating device according to the present embodiment is formed by coupling multiple units 40 with their central axes AX aligned with each other. Multiple cores 41 of the respective multiple units 40 constitute a shaft of the fluid activating device. The multiple first peripheral walls 42 of the respective multiple units 40 constitute the first tubular body, and the second peripheral walls 45 of the respective multiple units 40 constitute the second tubular body.

The fluid activating device formed using the units 40 according to the present embodiment includes the second peripheral wall 45 whose inside is concentrically divided, and the multiple first protrusions 44 and the multiple second protrusions 47 that are provided on the inner peripheral surface of the first peripheral wall 42 (first tubular body) and the inner peripheral surface of the second peripheral wall 45 (second tubular body), respectively. Thus, the first protrusions 44 on the inner peripheral surface of the first peripheral wall 42 and the second protrusions 47 on the inner peripheral surface of the second peripheral wall 45, increase the amount of generation of ultra-fine bubbles. The unit 40 having the nested structure can be particularly suitably applied to a fluid activating device with a large diameter, and can improve generation efficiency of ultra-fine bubbles in a fluid activating device increased in diameter.

FIG. 22, FIG. 22 is a schematic view of a component unit of a fluid activating device according to a modification of the ninth embodiment.

FIG. 22 illustrates a unit 50 that is provided with multiple first blades 48 and multiple second blades 49 instead of the multiple first blades 43 and the multiple second blades 46 of the unit 40 illustrated in FIG. 22. The first blade 48 and the second blade 49 are identical in shape to the blade 15 (FIG. 9) shown in the second embodiment. That is, the first blade 48 and the second blade 49 include multiple protrusions 51 and 52, respectively, the multiple protrusions 51 and 52 being provided on corresponding front and back surfaces of the first blade 48 and the second blade 49 while extending in a radial direction of the unit 50. The protrusions 51 and 52 are identical in shape to the protrusion 16 (FIG. 9) of the second embodiment. Fluid flowing while swirling inside the fluid activating device, collides with the multiple protrusions 51 provided on the front and back surfaces of the first blade 48 and the multiple protrusions 52 provided on the front and back surfaces of the second blade 49. At this time, a turbulent flow is generated near a ridgeline of each of the protrusions 51 and 52, and then many ultra-fine bubbles are generated by the turbulent flow. Thus, when the fluid activating device is composed of the unit 50 according to the present embodiment, generation efficiency of ultra-fine bubbles can be further improved as compared with when the unit 40 illustrated in FIG. 22 is used.

Tenth Embodiment

FIG. 23 is a schematic view of a fluid activating device according to a tenth embodiment.

A fluid activating device 800 includes fluid activating devices 100a to 100g that are each identical to as the fluid activating device 100 according to the first embodiment and that are disposed in parallel. The fluid activating devices 100a to 100b are disposed with their central axes parallel to each other and are fixed to each other. Means for fixing the fluid activating devices 100a to 100g is not particularly limited. The present embodiment enables fabricating the fluid activating device 800 with a large diameter by combining the fluid activating devices 100a to 100g each with a relatively small diameter. Additionally, changing the number of fluid activating devices each with a small diameter to be combined, enables the fluid activating device 800 to be easily changed in shape and size of its section. Instead of the fluid activating device according to the first embodiment, multiple fluid activating devices according to any one of the second, third, and ninth embodiments may be disposed in parallel.

INDUSTRIAL APPLICABILITY

The present invention is applicable to a fluid activating device.

Reference Code Description 1 core
2 peripheral wall
3 blade
4 rib
6 boss
7 recess
10 unit
11 first positioning part
12 second positioning part
15 blade
16 ridge
20 unit
21 shaft
22 tubular body
23 blade
24 rib
30 unit
40 unit
41 core
42 first peripheral wall
43 first blade
44 first protrusion
45 second peripheral wall
46 second blade
47 second protrusion
48 first blade
49 second blade
51, 52 protrusion
100, 200, 300, 400, 500, 600, 700, 800 fluid activating device

The invention claimed is:

1. A fluid activating device comprising:
a shaft in a cylindrical columnar shape;
a tubular body provided with a hollow part to accommodate the shaft with a predetermined interval between an inner peripheral surface of the hollow part and an outer peripheral surface of the shaft; and
multiple blades that are provided between the outer peripheral surface of the shaft and an inner peripheral surface of the tubular body while forming a flow path extending spirally from one end of the tubular body toward another end of the tubular body, and that generate a turbulent flow in fluid flowing in the flow path, wherein
the tubular body has an inner peripheral surface provided with multiple ribs each composed of a ridge extending in an axial direction of the shaft.

2. The fluid activating device according to claim 1, wherein the multiple ribs are provided throughout an inner peripheral surface of the peripheral wall.

3. The fluid activating device according to claim 1, wherein
each of the multiple ribs increases in height from a connection part with one of the multiple ribs adjacent to the corresponding one of the multiple ribs, the one of the multiple ribs being adjacent backward in a turning direction of the flow path, toward a connection part with another of the multiple ribs adjacent to the corresponding one of the multiple ribs, the another of the multiple ribs being adjacent forward in the turning direction of the flow path, and
the connection part with the another of the multiple ribs adjacent to the corresponding one of the multiple ribs, the another of the multiple ribs adjacent forward in the turning direction of the flow path, is provided with a step.

4. The fluid activating device according to claim 1, wherein
each of the multiple blades includes multiple protrusions each extending in a radial direction of the tubular body, and
the multiple protrusions each provided on corresponding one of the multiple blades, have a thickness increasing in the turning direction of the flow path to a predetermined thickness and then rapidly decreasing at a connection part with one of the multiple protrusions adjacent to the corresponding one of the multiple protrusions.

5. The fluid activating device according to any of claim 1, wherein each of the multiple blades has a section in a saw blade shape.

6. The fluid activating device according to claim 1, wherein
the fluid activating device includes multiple units identical in shape, the multiple units each including:
a core in a cylindrical columnar shape;
a peripheral wall in a tubular shape coaxial with the core and surrounding the core with a predetermined interval from an outer peripheral surface of the core; and
the multiple blades that are connected to the outer peripheral surface of the core and/or an inner peripheral surface of the peripheral wall and that are disposed at a predetermined pitch in a circumferential direction of the core, wherein
the peripheral wall has the inner peripheral surface provided with multiple protrusions constituting the respective multiple ribs.

7. The fluid activating device according to claim 6, wherein
each of the multiple units is disposed by being rotated by a certain rotation angle in a certain rotation direction about a central axis of the core in order from one end side toward another end side of the fluid activating device, and
the flow path extending spirally from the one end side to the other end side of the fluid activating device, is formed inside the peripheral wall.

8. The fluid activating device according to claim 7, wherein
the core has first and second surfaces on the one end side and the other end side of the fluid activating device, respectively, the first surfaces being provided with a first fitting part, and the second surfaces being provided with a second fitting part allowed to be fitted to the first fitting part, and
the second fitting part is provided at a rotational position rotated by the certain rotation angle in the certain rotation direction about the central axis of the core, with respect to the first fitting part.

9. The fluid activating device according to claim 7, wherein
the peripheral wall has an outer peripheral surface provided with a first positioning part and a second positioning part, and
when the first positioning part provided in one of paired units adjacent to each other and the second positioning part provided in another of the paired units adjacent to each other, are disposed at an identical rotational position in a circumferential direction of the peripheral wall, the other of the paired units is disposed at a rotational position rotated by the certain rotation angle in the certain rotation direction about the central axis of the core with respect to the one of the paired units.

10. A fluid activating device comprising:
a shaft in a cylindrical columnar shape;
a first tubular body provided with a first hollow part to accommodate the shaft with a predetermined interval between an inner peripheral surface of the first hollow part and an outer peripheral surface of the shaft;
multiple first blades that are provided between the outer peripheral surface of the shaft and an inner peripheral surface of the second tubular body while forming a first flow path extending spirally from one end side toward another end side of the first tubular body, and that generate a turbulent flow in fluid flowing through the first flow path;
multiple first ribs that are provided on an inner peripheral surface of the first tubular body and that are each composed of a ridge extending in an axial direction of the shaft;
a second tubular body provided with a second hollow part to accommodate the first tubular body with a predetermined interval between an inner peripheral surface of the second hollow part and the outer peripheral surface of the shaft;
multiple second blades that are provided between an outer peripheral surface of the first tubular body and the inner peripheral surface of the second tubular body while forming a second flow path extending spirally from one end side toward another end side of the second tubular body, and that generate a turbulent flow in fluid flowing through the second flow path; and
multiple second ribs that are provided on the inner peripheral surface of the second tubular body and that are each composed of a ridge extending in the axial direction of the shaft.

* * * * *